(12) United States Patent
Young (10) Patent No.: US 10,329,164 B2
(45) Date of Patent: Jun. 25, 2019

(54) SYSTEM FOR AND METHOD OF AFFECTING MOLECULES AND ATOMS WITH ELECTROMAGNETIC RADIATION

(75) Inventor: Gregory C. D. Young, Asheville, NC (US)

(73) Assignee: Kathleen Blanchette, Asheville, NC (US)

( * ) Notice: Subject to any disclaimer, the term of this patent is extended or adjusted under 35 U.S.C. 154(b) by 2715 days.

(21) Appl. No.: 11/829,614

(22) Filed: Jul. 27, 2007

(65) Prior Publication Data

US 2008/0245654 A1 Oct. 9, 2008

Related U.S. Application Data (60) Provisional application No. 60/820,918, filed on Jul. 31, 2006.

(51) Int. Cl.
*C01B 3/04* (2006.01)
*C02F 1/00* (2006.01)
(Continued)

(52) U.S. Cl.
CPC ............. *C02F 1/005* (2013.01); *C01B 3/042* (2013.01); *C01B 2203/0855* (2013.01);
(Continued)

(58) Field of Classification Search
CPC ........ G01N 37/005; G21G 1/00; C02F 1/005; C02F 1/461; C02F 1/48; C02F 1/34;
(Continued)

(56) References Cited

U.S. PATENT DOCUMENTS 2,617,039 A 11/1952 Young
2,745,861 A * 5/1956 Bodine, Jr. .............. 204/157.42
(Continued)

FOREIGN PATENT DOCUMENTS

WO WO 2004/112515 12/2004

OTHER PUBLICATIONS

Heyrovska, "The golden ratio, atomic, ionic, and molecular capacities and bonding distances in hydrides," International Joint meeting of ECS, USA and Japanese, Korean and Australian Societies, Honolulu, Hawaii, Oct. 2004, vol. 2004—2, Extended. Abs. C2-0551. (in English), available online at http://www.electrochem.org/dl/ma/206/pdfs/0551.pdf.*
(Continued)

*Primary Examiner* — Nicholas A Smith
*Assistant Examiner* — Colleen M Raphael
(74) *Attorney, Agent, or Firm* — Hershkovitz & Associates, PLLC; Abe Hershkovitz (57) ABSTRACT

A system for and method of cleaving a bond between a first atom and a second atom in a molecule of a material are presented. One embodiment of the technique includes selecting a first electromagnetic radiation frequency, the first electromagnetic radiation frequency including a product of a golden mean and a base frequency associated with at least one of the first atom and the second atom. Such an embodiment further includes directing a first electromagnetic radiation at the material, where the first electromagnetic radiation has a frequency equal to the first electromagnetic radiation frequency, and where the first electromagnetic radiation frequency is sufficient to cleave the bond between the first atom and the second atom.

21 Claims, 5 Drawing Sheets

POLAR GRAPHICAL REPRESENTATION OF FORMULA II (51) Int. Cl.
*C02F 1/34* (2006.01)
*C02F 1/48* (2006.01)
*C02F 1/461* (2006.01)

(52) U.S. Cl.
CPC ............... *C02F 1/34* (2013.01); *C02F 1/461* (2013.01); *C02F 1/48* (2013.01); *Y02E 60/364* (2013.01)

(58) Field of Classification Search
CPC ......... C02F /; C01B 3/042; C01B 2203/0855; Y02E 60/364
USPC ............. 204/157.15, 157.5, 157.52, 157.42, 204/157.41; 205/339–340
See application file for complete search history.

(56) References Cited

U.S. PATENT DOCUMENTS

| | | | | |
|---|---|---|---|---|
| 3,245,892 | A * | 4/1966 | Jones | 204/157.42 |
| 3,904,500 | A * | 9/1975 | Jensen | 204/157.2 |
| 4,124,466 | A * | 11/1978 | Morrey | B01D 59/34 204/157.41 |
| 4,207,154 | A * | 6/1980 | Lemelson | 204/157.42 |
| 4,213,836 | A * | 7/1980 | Freund et al. | 204/157.22 |
| 4,305,794 | A * | 12/1981 | Davidson et al. | 205/340 |
| 4,338,114 | A | 7/1982 | Brockway et al. | |
| 4,366,125 | A * | 12/1982 | Kodera et al. | 422/295 |
| 4,369,100 | A * | 1/1983 | Sawyer | 204/157.42 |
| 4,615,984 | A * | 10/1986 | Stoker | 204/157.42 |
| 4,702,808 | A * | 10/1987 | Lemelson | 204/157.42 |
| 4,808,286 | A * | 2/1989 | Angelo, II | B01J 19/088 204/157.52 |
| 4,879,011 | A * | 11/1989 | Schram | 204/157.42 |
| 4,936,961 | A * | 6/1990 | Meyer | 204/157.52 |
| 5,108,566 | A * | 4/1992 | Eerkens | B01D 59/34 204/157.2 |
| 5,714,665 | A * | 2/1998 | Ohtake | B01D 53/007 204/157.15 |
| 6,451,616 | B1 | 9/2002 | Odom et al. | |
| 6,547,935 | B2 * | 4/2003 | Scott | 204/158.2 |
| 6,592,723 | B2 * | 7/2003 | Cha | 204/157.52 |
| 6,638,413 | B1 * | 10/2003 | Weinberg | C25B 1/04 204/157.52 |
| 6,719,817 | B1 * | 4/2004 | Marin | 422/225 |
| 7,125,480 | B2 * | 10/2006 | Austin | 204/157.52 |
| 7,482,072 | B2 * | 1/2009 | Brooks et al. | 204/157.15 |
| 2002/0100836 | A1 * | 8/2002 | Hunt | C01B 3/042 244/50 |
| 2003/0103067 | A1 * | 6/2003 | Trell | 345/700 |
| 2003/0183505 | A1 * | 10/2003 | Austin | 204/157.15 |
| 2003/0226401 | A1 * | 12/2003 | Letovsky | 73/579 |
| 2004/0089532 | A1 * | 5/2004 | Brooks et al. | 204/157.15 |
| 2005/0014640 | A1 | 1/2005 | Ovshinsky | |
| 2006/0056468 | A1 | 3/2006 | Dantus et al. | |
| 2007/0274905 | A1 * | 11/2007 | Wynn | C01B 3/042 423/658.2 |
| 2008/0034287 | A1 * | 2/2008 | Mills | 715/273 |
| 2008/0069738 | A1 * | 3/2008 | Ishikawa | A61K 31/4743 422/105 |
| 2009/0071817 | A1 * | 3/2009 | Ishikawa | A61K 41/0004 204/157.68 |
| 2009/0084107 | A1 * | 4/2009 | Gleasman | 204/157.52 |

OTHER PUBLICATIONS

Heyrovska and Narayan, "Fine-structure constant, anomalous magnetic moment, relativity factor, and the golden ratio that divides the Bohr radius," 2005, available online at arXiv:physics/0509207.*

Heyrovska, "Exploring the atomic properties using ionization potential and golden ratio," Prac. Setkani Fyz. Chem. Electrochem. 5, 2005, s. 23-24 (i.e. p. 32-33).*

R.R. Jovanovic, "Fine structure constant," available online at http://milan.milanovic.org/math/english/alpha/alpha.html, published 2006.*

Bayles, "The Golden Ratio and the Fine Structure Constant" (2005).*

Piszczatowksi et al, "Theoretical determination of the dissociation energy of molecular hydrogen," J. Chem. Theory Comput. vol. 5 (2009), pp. 3039-3048.*

Heyrovska, "Dependence of Ion-water Distances on Covalent Radii, Ionic Radii in Water and Distances of Oxygen and Hydrogen of Water from Ion/water Boundaries," Chem. Phys. Lett. 429 (2006) pp. 600-605.*

Crim et al, "State- and Bond-Selected Photodissociation and Bimolecular Reaction of Water [and Discussion]," Phil. Trans. R. Soc. Lond. A (1990) vol. 332, pp. 259-272.*

Crim, "Vibrationally Mediated Photodissociation: Exploring Excited-State Surfaces and Controlling Decomposition Pathways," Annu. Rev. Phys. Chem. 1993, vol. 44, pp. 397-428.*

Adhikari et al, "Selective control of photodissociation in deuterated water molecule HOD," Rad. Phys. & Chem. vol. 75 (2006), pp. 2106-2118.*

Ohmura et al, "Control of photodissociation: vibrational mode selection and quantum interference," J. of Photochem & Photobio. A: Chemistry vol. 158 (2003) pp. 69-76.*

Khriachtchev et al, "Conformational Memory in Photodissociation of Formic Acid," J. Am. Chem. Soc. 2002, vol. 124, pp. 10994-10995.*

Naganaya et al, "Laser control of molecular photodissociation with use of the complete reflection phenomenon," J. Chem. Phys. vol. 113, No. 15, Oct. 15, 2000, pp. 6197-6209.*

Selvan, A.M., "Quantam-Like Chaos in Prime Number Distribution and in Turbulent Fluid Flows" *Apeiron*, vol. 8, No. 3, (Jul. 2001) [Retrieved from the Internet on Jul. 16, 2008] URL: <http.//redshift.vif.com/JournalFiles/V08NO3PDF/Vo8N3SEL.PDF>.

Fan, H., "Mimicking the Action of Folding Chaperones in Molecular Dynamics Simulations", *Application to the Refinement of Homology-Based Protein Structures*, (Apr. 2004) [Retrieved from the Internet on Jul. 15, 2008 (Jul. 15, 2008)] URL: <http://www.pubmedcentral.nih.gov/articlerender.fcgi?artid=2280060>.

Notification of Transmittal of the International Search Report and the Written Opinion of the International Searching Authority, or the Declaration, dated Jul. 25, 2008.

* cited by examiner

SYSTEM FOR AND METHOD OF AFFECTING MOLECULES AND ATOMS WITH ELECTROMAGNETIC RADIATION

RELATED APPLICATIONS

The present application claims priority to U.S. Provisional Application No. 60/820,918 entitled "System For And Method Of Affecting Molecules And Atoms With Electromagnetic Radiation" to Young, filed Jul. 31, 2006, the disclosure of which is incorporated herein in its entirety.

FIELD OF THE INVENTION

The invention provides a method for selectively affecting targeted atoms and/or molecules by exposing the atoms and/or molecules to a frequency or frequencies of electromagnetic radiation selected for the targeted atom or molecule.

BACKGROUND OF THE INVENTION

Prior to this invention, a specific technique for determining targeted electromagnetic radiation frequencies for affecting the atoms or molecules was unknown.

The molecules that make up compositions of matter may be held together via chemical bonds, such as ionic bonds, covalent bonds, and hydrogen bonds. Cleavage of these bonds is of interest to scientists and manufacturers, but effective methods of such cleavage have encountered numerous obstacles.

Liu et al., *Science* 312, 1024 (2006) report resonant photodesorption of hydrogen from a Si(111) surface using tunable infrared radiation. According to Liu et al., selective bond cleavage by vibration excitation is typically thwarted by energy thermalization. Tully, J. C., *Science* 312, 1004 (2006) reports that the main impediment to IR mode-selective chemistry is that vibrational energy tends to be redistributed rapidly within a molecule.

SUMMARY OF THE INVENTION

According to an embodiment of the present invention, a method of breaking (also referred to herein as "cleaving" or "dissociating") a bond between a first atom and a second atom in a molecule of a material is presented. A first electromagnetic radiation frequency, the first electromagnetic radiation frequency comprising a product of a golden mean and a base frequency associated with at least one of the first atom and the second atom is selected. A first electromagnetic radiation is directed at the material, the first electromagnetic radiation having a frequency equal to the first electromagnetic radiation frequency. The first electromagnetic radiation frequency is sufficient to break the bond between the first atom and the second atom.

Various optional features of the above embodiment include the following. The material may be a liquid and the liquid may be caused to cavitate. The first electromagnetic radiation frequency may further comprise a power of the golden mean, the power being a positive integer. The first electromagnetic radiation frequency ($v_1$) may be defined by the equation $v_1 = A_{fr} \cdot \Phi^n \cdot e \cdot 10^m$, where $A_{fr}$ is a base frequency associated with either the first or second atom, $\Phi$ is a golden mean, e is a natural log base, n is an integer, and m is an integer. A second electromagnetic radiation frequency may be selected, the second electromagnetic radiation frequency comprising a product of a golden mean and a base frequency associated with at least one of the first atom and the second atom. A second electromagnetic radiation may be directed at the material, the second electromagnetic radiation having a frequency equal to the second electromagnetic radiation frequency, where the first electromagnetic radiation frequency and the second electromagnetic radiation frequency are sufficient to break the bond between the first atom and the second atom. The second electromagnetic radiation frequency ($v_2$) may be defined by the equation $v_2 = B_{fr} \cdot \Phi^j \cdot e \cdot 10^k$, where $B_{fr}$ is a base frequency associated with either the first or second atom, $\Phi$ is a golden mean, e is a natural log base, j is an integer, and k is an integer. The term $A_{fr}$ may be associated with the first atom and $B_{fr}$ may be associated with the second atom. The terms $A_{fr}$ and $B_{fr}$ may be different. The terms $A_{fr}$ and $B_{fr}$ may be the same or different; m and k may be the same or different; and n and j may be the same or different. The material may be irradiated with a second electromagnetic radiation frequency ($v''$) defined by the equation $v'' = A_{fr} \cdot \Phi^x \cdot e^{-Lt} \cdot 10^y$, where $A_{fr}$ is a base frequency associated with either the first or second atom, $\Phi$ is a golden mean, e is a natural log base, L is the natural log of two, t is equal to n, x is an integer, and y is an integer. The material may be irradiated with a second electromagnetic radiation frequency ($v'''$) defined by the equation $v''' = (A_{fr} \cdot \Phi^a \cdot L^{-1}) \cdot 10^b e^{-L}$, where $A_{fr}$ is a base frequency associated with either the first or second atom, $\Phi$ is a golden mean, e is a natural log base, L is the natural log of two, a is an integer, and b is an integer. The method may comprise irradiation of a material with at least one frequency according to at least one of each of $v_1$, $v_2$, $v''$ and $v'''$. The material may be irradiated with a first and a second electromagnetic radiation having material concurrently, where the first electromagnetic radiation has a frequency of $v_1$, and the second electromagnetic radiation has a frequency of $v''$ and/or $v'''$. One of the first or second atoms may be a hydrogen atom and the other of the first or second atoms may be an oxygen atom. The hydrogen atom and the oxygen atom may be part of a water molecule and the material may be water. The water may be subjected to cavitation. The water may be subjected to a magnetic field. The electromagnetic field may be pulsed. The electromagnetic field may be pulsed at a frequency ($v_p$) according to the formula $v_p = A_{fr} \cdot \Phi^n \cdot e \cdot 10^m$, where $A_{fr}$ is a base frequency associated with an atom in a water molecule, $\Phi$ is a golden mean, e is a natural log base, n is an integer, and m is an integer. Electrical current may be caused to flow through the water. At least one of m and k may be zero in the equations for $v_1$ and $v_2$. The terms n and j may be zero, positive, or negative integers.

According to an embodiment of the present invention, a method of strengthening a bond between a first atom and a second atom in a molecule of a material is provided. The method includes selecting a first electromagnetic radiation frequency, the first electromagnetic radiation frequency including a product of a golden mean and a base frequency associated with at least one of the first atom and the second atom. The method also includes directing a first electromagnetic radiation at the material, the first electromagnetic radiation having a frequency equal to the first electromagnetic radiation frequency, where the first electromagnetic radiation frequency is sufficient to strengthen the bond between the first atom and the second atom.

Various optional features of the embodiment of the preceding paragraph include the following. The first electromagnetic radiation frequency ($v_1$) may be defined by the equation $v_1 = A_{fr} \cdot \Phi^n \cdot e \cdot 10^m$, where $A_{fr}$ is a base frequency associated with either the first or second atom, $\Phi$ is a golden mean, e is a natural log base, n is an integer, and m is an integer. The method may include selecting a second electromagnetic radiation frequency, the second electromagnetic radiation frequency comprising a product of a golden mean and a base frequency associated with at least one of the first atom and the second atom, and directing a second electromagnetic radiation at the material, the second electromagnetic radiation having a frequency equal to the second electromagnetic radiation frequency, where the first electromagnetic radiation frequency and the second electromagnetic radiation frequency are sufficient to strengthen the bond between the first atom and the second atom. The first electromagnetic radiation frequency ($v_1$) may be defined by the equation $v_1 = A_{fr} \cdot \Phi^n \cdot e \cdot 10^m$, where $A_{fr}$ is a base frequency associated with either the first or second atom, $\Phi$ is a golden mean, e is a natural log base, n is an integer, and m is an integer. The second electromagnetic radiation frequency ($v_2$) may be defined by the equation $v_2 = B_{fr} \cdot \Phi^j \cdot e \cdot 10^k$, where $B_{fr}$ is a base frequency associated with either the first or second atom, $\Phi$ is a golden mean, e is a natural log base, j is an integer, and k is an integer. Any of the terms m, n, j, and k may be positive or negative integers. The material may be irradiated with a second electromagnetic radiation having a frequency (v") defined by the equation $v'' = A_{fr} \cdot \Phi^x \cdot e^{-Lt} \cdot 10^y$, where $A_{fr}$ is a base frequency associated with either the first or second atom, $\Phi$ is a golden mean, e is a natural log base, L is the natural log of two, t is equal to n, x is an integer, and y is an integer. The material may be irradiated with a second electromagnetic radiation having a frequency (v''') defined by the equation $v''' = (A_{fr} \cdot \Phi^a \cdot L^{-1}) \cdot 10^b e^{-L}$, where $A_{fr}$ is a base frequency associated with either the first or second atom, $\Phi$ is a golden mean, e is a natural log base, L is the natural log of two, a is an integer, and b is an integer. The method may comprise irradiation of a material with electromagnetic radiation having at least one frequency according to at least one of each of $v_1$, $v_2$, v" and v'''. The material may be irradiated with a first and a second electromagnetic radiation concurrently, where the first electromagnetic radiation has a frequency of $v_1$, and the second electromagnetic radiation has a frequency of v" and/or v'''. The terms n and j may zero, positive, or negative integers.

According to an embodiment of the present invention, a method of facilitating the formation of a bond between a first atom and a second atom is presented. The method includes selecting a first electromagnetic radiation frequency, the first electromagnetic radiation frequency comprising a product of a golden mean and a base frequency associated with at least one of the first atom and the second atom. The method also includes directing a first electromagnetic radiation at the first and second atoms, the first electromagnetic radiation having a frequency equal to the first electromagnetic radiation frequency, where the first electromagnetic radiation frequency is sufficient to facilitate the formation of the bond between the first atom and the second atom.

Various optional features of the embodiment of the preceding paragraph include the following. The first electromagnetic radiation frequency ($v_1$) may be defined by the equation $v_1 = A_{fr} \cdot \Phi^n \cdot e \cdot 10^m$, where $A_{fr}$ is a base frequency associated with either the first or second atom, $\Phi$ is a golden mean, e is a natural log base, n is an integer, and m is an integer. The method may include selecting a second electromagnetic radiation frequency, the second electromagnetic radiation frequency comprising a product of a golden mean and a base frequency associated with at least one of the first atom and the second atom, and directing a second electromagnetic radiation at the first and second atoms, the second electromagnetic radiation having a frequency equal to the second electromagnetic radiation frequency, where the first electromagnetic radiation frequency and the second electromagnetic radiation frequency are sufficient to facilitate the formation of the bond between the first atom and the second atom. The first electromagnetic radiation frequency ($v_1$) may be defined by the equation $v_1 = A_{fr} \cdot \Phi^n \cdot e \cdot 10^m$, where $A_{fr}$ is a base frequency associated with either the first or second atom, $\Phi$ is a golden mean, e is a natural log base, n is an integer, and m is an integer. The second electromagnetic radiation frequency ($v_2$) may be defined by the equation $v_2 = B_{fr} \cdot \Phi^j \cdot e \cdot 10^k$, where $B_{fr}$ is a base frequency associated with either the first or second atom, $\Phi$ is a golden mean, e is a natural log base, j is an integer, and k is an integer. Any of the terms m, n, j, and k may be positive or negative integers. The terms n and j may be negative integers. The material may be irradiated with a second electromagnetic radiation having a frequency (v") defined by the equation $v'' = A_{fr} \cdot \Phi^z \cdot e^{-Lt} \cdot 10^y$, where $A_{fr}$ is a base frequency associated with either the first or second atom, $\Phi$ is a golden mean, e is a natural log base, L is the natural log of two, t is equal to n, x is an integer, and y is an integer. The material may be irradiated with a second electromagnetic radiation having a frequency (v''') defined by the equation $v''' = (A_{fr} \cdot \Phi^a \cdot L^{-1}) \cdot 10^b e^{-L}$, where $A_{fr}$ is a base frequency associated with either the first or second atom, (d) is a golden mean, e is a natural log base, L is the natural log of two, a is an integer, and b is an integer. The method may comprise irradiation of a material with at least one frequency according to at least one of each of $v_1$, $v_2$, v" and v'''. The material may be irradiated with a first and a second electromagnetic radiation concurrently, where the first electromagnetic radiation has a frequency of $v_1$, and the second electromagnetic radiation has a frequency of v" and/or v'''.

According to an embodiment of the present invention, a method of mimicking the presence of a molecule, the molecule having at least a first atom and a second atom, in a material, is presented. The method includes selecting a first electromagnetic radiation frequency, the first electromagnetic radiation frequency comprising a product of a golden mean and a base frequency associated with at least one of the first atom and the second atom. The method also includes directing a first electromagnetic radiation at the material, the first electromagnetic radiation having a frequency equal to the first electromagnetic radiation frequency, where the first electromagnetic radiation frequency is sufficient to mimic the presence of a molecule in a material. In this embodiment, the first electromagnetic radiation frequency ($v_1$) may be defined by the equation $v_1 = A_{fr} \cdot \Phi^n \cdot e \cdot 10^m$, where $A_{fr}$ is a base frequency associated with either the first or second atom, $\Phi$ is a golden mean, e is a natural log base, n is an integer, and m is an integer. The material may be irradiated with a second electromagnetic radiation frequency (v") defined by the equation $v'' = A_{fr} \cdot \Phi^r \cdot e^{-Lt} \cdot 10^y$, where $A_{fr}$ is a base frequency associated with either the first or second atom, $\Phi$ is a golden mean, e is a natural log base, L is the natural log of two, t is equal to n, x is an integer, and y is an integer. The material may be irradiated with a second electromagnetic radiation having a frequency (v''') defined by the equation $v''' = (A_{fr} \cdot \Phi^a \cdot L^{-1}) \cdot 10^b e^{-L}$, where $A_{fr}$ is a base frequency associated with either the first or second atom, $\Phi$ is a golden mean, e is a natural log base, L is the natural log of two, a is an integer, and b is an integer. The method may comprise irradiation of a material with at least one frequency according to at least one of each of $v_1$, $v_2$, v" and v'''. The material may be irradiated with a first and a second electromagnetic radiation having material concurrently, where the first electromagnetic radiation has a frequency of $v_1$, and the second electromagnetic radiation has a frequency of $v''$ and/or $v'''$.

According to an embodiment of the present invention, a method of enhancing the electrolysis of water is provided. A first electromagnetic radiation frequency ($v_1$), defined by the equation $v_1 = A_{fr} \cdot \Phi^n \cdot e \cdot 10^m$, is selected, where $A_{fr}$ is a base frequency associated with an atom in a water molecule, $\Phi$ is a golden mean, e is a natural log base, n is a non-negative integer, and m is a non-negative integer. A second electromagnetic radiation frequency ($v_2$), defined by the equation $v_2 = B_{fr} \cdot \Phi^j \cdot e \cdot 10^k$, is selected, where $B_{fr}$ is a base frequency associated with an atom in a water molecule, $\Phi$ is a golden mean, e is a natural log base, j is a nonnegative integer, and k is a nonnegative integer. The water is caused to cavitate. A first electromagnetic radiation having the first frequency is directed at the water. A second electromagnetic radiation having the second frequency is directed at the water. The step of directing the first electromagnetic radiation may occur simultaneously with the step of directing the second electromagnetic radiation. Electrical current is caused to flow through the water. An optional feature of the above embodiment includes that at least one of m and k may be equal to zero.

DETAILED DESCRIPTION OF THE INVENTION

Certain embodiments of the invention provide a system for manipulating or affecting an atom or a molecule by exposing the atom or molecule to electromagnetic radiation. By affecting a molecule, it is to be understood that the effect may be on any one or more of the atoms comprising the molecule. Furthermore, by affecting an atom or molecule, it is to be understood that a method of the invention includes affecting the atomic or molecular electron orbitals, or a combination thereof, of the atom or molecule to be affected. Embodiments of the invention provide a way to select a discrete number of frequencies of electromagnetic radiation suitable for affecting an atom or molecule and a technique for affording an effect by irradiation of the atom or molecule with at least one frequency of electromagnetic radiation selected thereby. Some embodiments of the invention provide a system for and method of cleaving or disassociating selected bonds by exposing the bonds to electromagnetic radiation. Other embodiments of the invention provide systems for and methods of selectively cleaving a bond between a first and a second atom by exposing the bond to electromagnetic radiation. In still other embodiments of the invention, the electromagnetic radiation may be used to strengthen bonds, including the facilitation of bond formation. In yet other embodiments of the invention, the electromagnetic radiation may be used to mimic atoms and/or molecules.

The method of affecting an atom or molecule may be achieved by irradiating the atom or molecule with a frequency of electromagnetic radiation ($v$) according to Formula I, depicted below. In some embodiments, the frequencies of electromagnetic radiation ($v$) according to Formula I fall within, and include, the range of yottahertz (yHz, on the order of $10^{-24}$ Hz) and yottahertz (Yhz, on the order of $10^{24}$ Hz). Other embodiments employ frequencies falling within ranges such as, by way of non-limiting examples, $10^{-10}$ Hz through $10^{10}$ Hz, $10^{-5}$ Hz through $10^5$ Hz, or $10^5$ Hz through $10^{20}$ Hz.

$$v = A_{fr} \cdot \Phi^n \cdot e \qquad \text{Formula I.}$$

In Formula I, $v$ is the frequency of radiation used to affect the atom or molecule. The term $A_{fr}$ represents the base frequency of the atom (including those within a molecule) to be affected. A base frequency of an atom is a spectroscopic parameter associated with that atom. The spectroscopic parameter may be, by way of non-limiting example, a frequency corresponding to the maximum wavelength of absorption ($\lambda_{max}$) for the molecular form of that atom. The symbol $\Phi$ represents the golden mean, equal to $\frac{1}{2}(1+\sqrt{5})$. The variable n may be any integer, including negative integers, positive integers and zero, and may be the same or different. The constant e is defined as the base for natural logs, equal to about 2.71828. In some embodiments, simultaneous exposure of the atom to multiple electromagnetic radiation frequencies falling within the scope of Formula I can be utilized. If the use of multiple electromagnetic radiation frequencies suitable for affecting an atom is desired, multiple electromagnetic radiation frequencies may be determined by solving Formula I for multiple values of n. It is contemplated that two, three or up to eight or more frequencies ($v$) of electromagnetic radiation may be used. The method of affecting the atom or molecule with multiple frequencies of electromagnetic radiation according to Formula I may be achieved by irradiation with the multiple frequencies of electromagnetic radiation simultaneously, sequentially or in a combination thereof. In other embodiments, exposure to a single electromagnetic frequency falling within the scope of Formula I may be utilized.

In certain embodiments of the invention, it is contemplated that the frequencies of electromagnetic radiation useful for affecting atoms or molecules may be various orders of magnitude of the frequency of electromagnetic radiation determinable by Formula I. Formula II may be solved in order to determine the frequencies of electromagnetic radiation ($v'$) that may be used to affect an atom or molecule according to an embodiment of the invention. In some embodiments, the frequencies ($v'$) of electromagnetic radiation according to Formula II fall within, and include, the range of yoctaherz (yHz, on the order of $10^{-24}$ Hz) and yottahertz (Yhz, on the order of $10^{24}$ Hz). Other embodiments employ frequencies falling within ranges such as, by way of non-limiting examples, $10^{-10}$ Hz through $10^{10}$ Hz, $10^{-5}$ Hz through $10^5$ Hz, or $10^5$ Hz through $10^{20}$ Hz. Note that in certain embodiments, both $v$ and $v'$ fall within these ranges. That is, once values for $v$ are calculated according to Formula I that fall within a given range, then additional orders of magnitude of $v$, calculated as $v'$ according to Formula II, may be calculated such that they still lie within the given range.

$$v' = v \cdot 10^m = A_{fr} \cdot \Phi^n \cdot e \cdot 10^m \qquad \text{Formula II.}$$

In Formula II, the term ν' is the frequency of radiation used to affect an atom or molecule and ν is as in Formula I. The term $A_{fr}$ represents the base frequency of the atom (including those in a molecule) to be affected. A base frequency of the atom is a spectroscopic parameter associated with that atom. The spectroscopic parameter may be, by way of non-limiting example, a frequency corresponding to the maximum wavelength of absorption ($\lambda_{max}$) for the molecular form of that atom. The symbol Φ represents the golden mean, equal to ½(1+√5). The variables n and m may be any integer, including negative integers, positive integers and zero, and may be the same or different. The constant e is defined as the base for natural logs, equal to about 2.71828. In some embodiments, simultaneous exposure of the atom or molecule to multiple electromagnetic radiation frequencies falling within the scope of Formula II can be utilized. If the use of multiple electromagnetic radiation frequencies suitable for affecting an atom or molecule is desired, multiple electromagnetic radiation frequencies may be determined by solving Formula II for multiple values of n or m, or a combination thereof. If it is desired to affect multiple atoms present or multiple atoms of a molecule, multiple frequencies may further be determined according to Formula II by inputting the base frequency parameter $A_{fr}$ for each bonded atom. It is contemplated that two, three or up to eight or more frequencies of electromagnetic radiation (ν') may be used. The atoms or molecules to be affected may be irradiated with the multiple frequencies of electromagnetic radiation simultaneously, sequentially or in a combination thereof. In other embodiments, exposure to a single electromagnetic radiation frequency falling within the scope of Formula II may be utilized.

Figure 1:
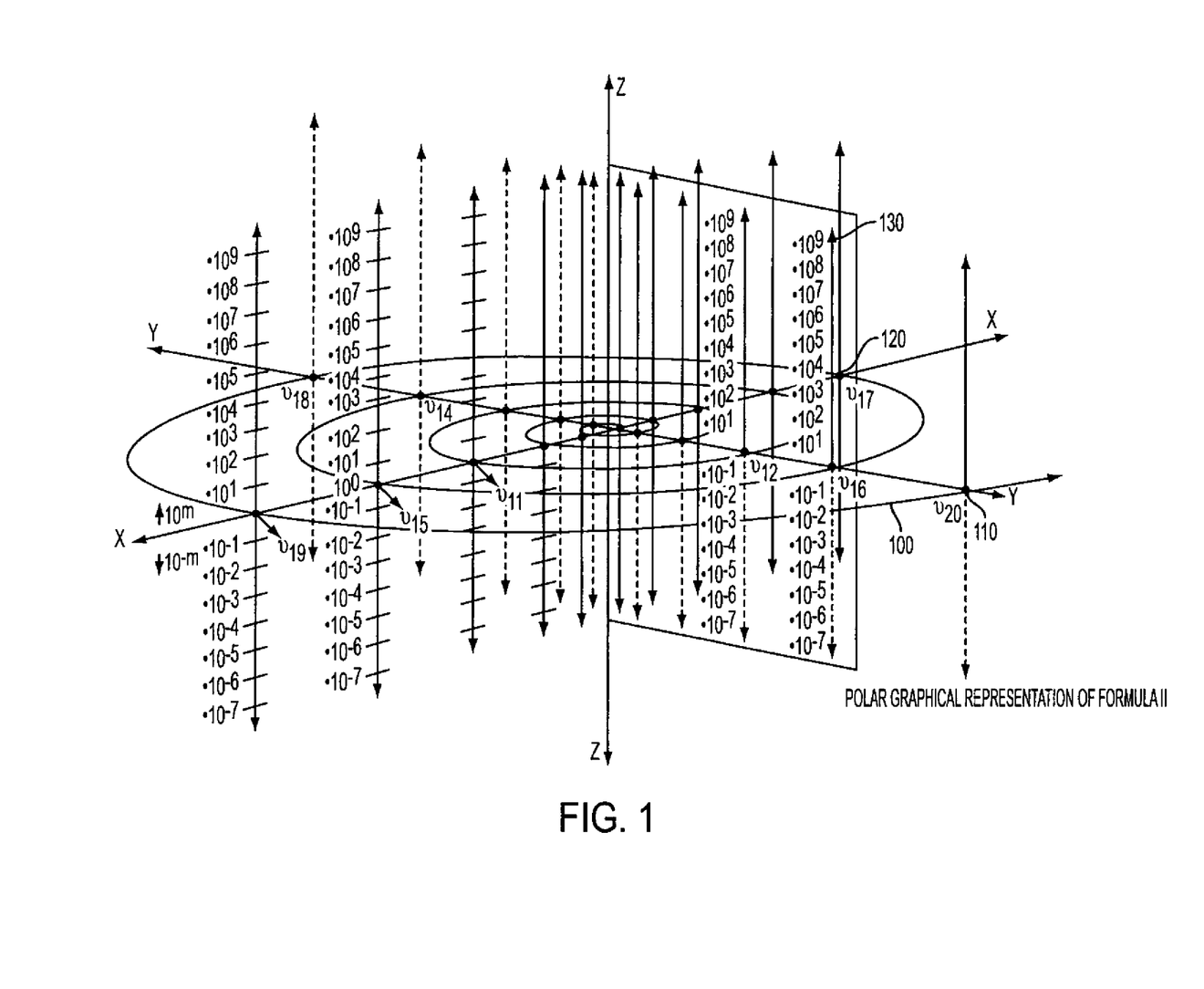
FIG. 1 is a schematic visualization of an electromagnetic radiation frequency selection equation according to an embodiment of the present invention.

FIG. 1 is a schematic visualization of Formula II according to an embodiment of the present invention. The xy-plane contains a golden spiral 100. In polar coordinates, golden spiral 100 complies with the formula $r=\Phi^{2\theta/\pi}$, where (r,θ) represents respective polar coordinates (radius, angle from the positive x-axis), Φ represents the golden mean, and π is the well-known mathematical constant equal to about 3.14. Values of ν (according to Formula I) are depicted where golden spiral 100 intersects the x- and y-axes. Specifically, a value for ν when n=0 appears at the origin (0,0), and additional values for ν are plotted on the x- and y-axes by traversing golden spiral 100 counterclockwise and outward as n increases. For example, the value of ν for n=20 appears on the y-axis at 110 and the value of ν for n=17 appears on the x-axis at 120. Orders of magnitude of each ν value according to Formula II are depicted above and below the respective ν value outside of the xy-plane. That is, orders of magnitude of a particular value of ν lie along the line parallel to the z-axis passing through the particular location in the xy-plane at which that value for ν is depicted. Orders of magnitude of ν values for which m is negative appear below the xy-plane, while orders of magnitude of ν values for which m is positive appear above the xy-plane. For example and according to Formula II, ν' when n=17 and m=9 appears at 130 in FIG. 1. In sum, FIG. 1 depicts a polar representation of Formula II as limit [yHz→YHz] $v_p = A_{fr} \cdot \Phi^n \cdot e \cdot 10^m$, where $v_1 \to v_{20}$, etc. are representations of the "prime EMF" existing on the xy-axis for a targeted element (e.g., hydrogen), and its respective "prime EMF octaves," existing on the z-axis, where the octaves=(specific prime EMF×$10^m$), and where m=±integers and n=±integers. Note that when n is positive, the spiral curve will rotate in a counter clockwise direction (as depicted), but when n is negative, the spiral curve will rotate in the opposite (clockwise) direction instead, ceterus peribus. Note further that FIG. 1 is not to scale and for illustration purposes only.

As seen in FIG. 1, Formula II may be used to calculate a finite number of specific values of electromagnetic frequencies for each type of atom (i.e. each element). From this finite number of electromagnetic frequencies, a technician with the aid of a tunable electromagnetic radiation frequency generator will be able to simply tune through the given predetermined electromagnetic frequencies corresponding to Formula II for the specific type of atom selected and observe and record which select electromagnetic frequency or frequencies are suitable for affecting the atom or molecule in the manner desired.

One embodiment of the invention includes a process of affecting a molecule in order to cleave or disassociate a bond between a first and a second atom. The first and second atoms may be of the same or different elements. Cleavage occurs by exposing the bond to electromagnetic radiation at a frequency according to Formula II. In some embodiments, covalent bonds (including polar covalent bonds), ionic bonds, hydrogen bonds and van der Waals interactions may be cleaved or disassociated by the method described herein.

In Formula II, the term ν' is the frequency of radiation used to cleave the bond. The term $A_{fr}$ represents the base frequency of one of the atoms that is bonded. A base frequency of one of the first or second atoms is a spectroscopic parameter associated with that atom. The spectroscopic parameter may be, by way of non-limiting example, a frequency corresponding to the maximum wavelength of absorption ($\lambda_{max}$) for the molecular form of that atom. The symbol Φ represents the golden mean, equal to ½(1+√5). The variables n and m may be any integer, including negative integers, positive integers and zero, and may be the same or different. In some embodiments, methods of cleaving or disassociating bonds are achieved by irradiating the bonds with frequencies of electromagnetic radiation selected from Formula II wherein the variable n is a positive integer. The constant e is defined as the base for natural logs, equal to about 2.71828. In some embodiments, simultaneous exposure of the bond to multiple electromagnetic radiation frequencies falling within the scope of Formula II can be utilized. If the use of multiple electromagnetic radiation frequencies suitable for cleaving a bond comprising a specific first atom and a second atom is desired, multiple electromagnetic radiation frequencies may be determined by solving Formula II for multiple values of n or m, or combinations thereof. Such multiple frequencies may further be determined according to Formula II by inputting the base frequency parameter $A_{fr}$ for each bonded atom. It is contemplated that two, three or up to eight or more frequencies of electromagnetic radiation (ν') may be used. The bonds to be cleaved may be irradiated with the multiple frequencies of electromagnetic radiation simultaneously, sequentially or in a combination thereof. In other embodiments, exposure to a single electromagnetic frequency falling within the scope of Formula II may be utilized.

Figure 2:
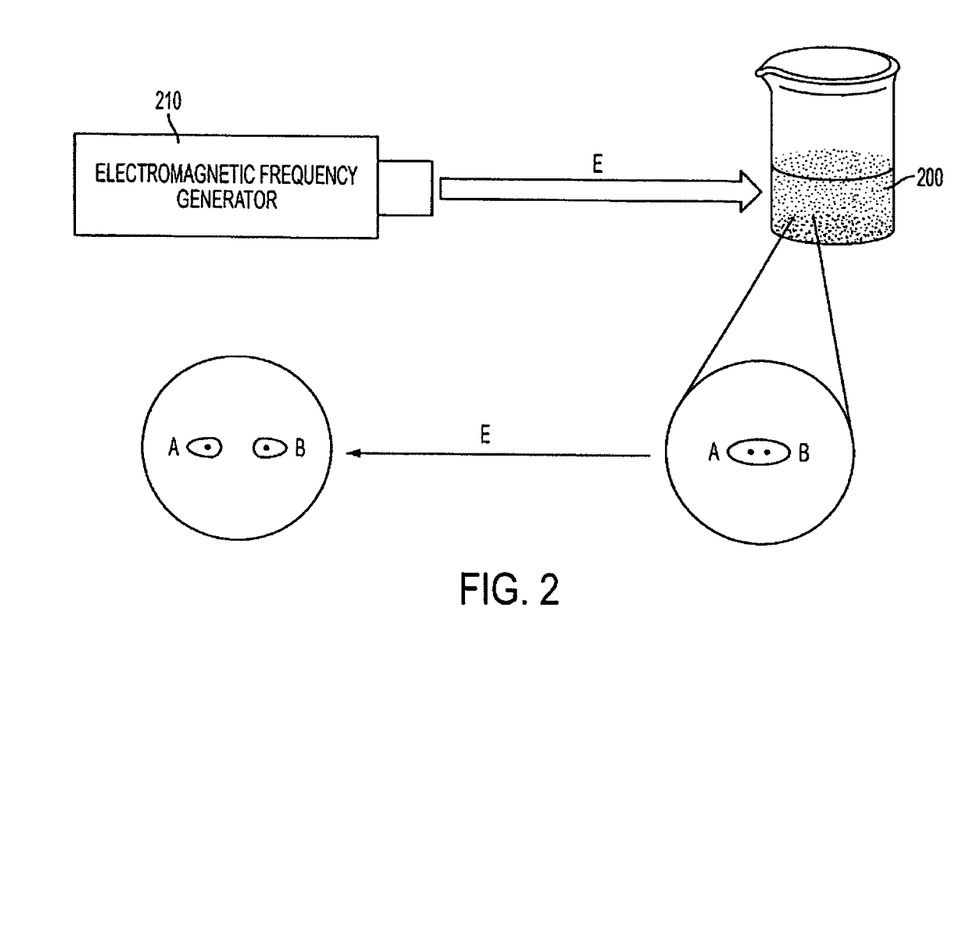
FIG. 2 illustrates a method of cleaving chemical bonds by exposing the bonds to electromagnetic radiation according to an embodiment of the invention.

FIG. 2 illustrates an embodiment of the invention wherein electromagnetic radiation (E) is directed to a material 200. The electromagnetic radiation (E) is generated by an electromagnetic frequency generator 210, such as by way of non-limiting examples, a laser, maser or oscillator. The frequency (ν') of the electromagnetic radiation is selected according to Formula II. The material may be in any form, such as a solid, liquid or gas. Depending on the atom utilized to determine the base frequency ($A_{fr}$) input into Formula II, the electromagnetic radiation (E) can be used to selectively cleave a bond between two atoms in the material 200, where the base frequency utilized to solve Formula II corresponds to at least one of the atoms in the material.

Formula II may be used to calculate a finite number of specific values of electromagnetic frequencies for each type of atom (i.e. each element). From this finite number of electromagnetic frequencies, a technician with the aid of a tunable electromagnetic radiation frequency generator will be able to simply tune through the given predetermined electromagnetic frequencies corresponding to Formula II for the specific type of atom selected and observe and record which select electromagnetic frequency or frequencies are suitable for cleaving the molecule. Such a technician may simply observe the material for signs that bonds have been broken.

One embodiment of the invention includes a method for cleaving a hydrogen-containing covalent bond, i.e. a covalent bond where one of the atoms is a hydrogen atom. When one of the first or second atoms is a hydrogen atom, the base frequency may be solved for hydrogen or for the second atom to which the hydrogen atom is bonded. Determination of the base frequency for hydrogen ($H_{fr}$) is accomplished by first determining the maximum wavelength of absorption ($\lambda_{max}$) for diatomic (molecular) hydrogen ($H_2$). The base frequency of an element is determined by the formula:

$$A_{fr} = C/\lambda_{max} \quad \text{Formula III.}$$

In Formula III, the term c represents the speed of light. Accordingly, with a maximum wavelength of 21.1 cm, the base frequency for ground state, natural hydrogen ($H_{fr}$) is about 1.420405751698 GHz.

The process of cleaving a covalent bond between a hydrogen atom and another atom may include directing electromagnetic radiation of one or more of the frequencies according to Formula II at a material having molecules with at least one covalent bond between a hydrogen atom and another atom. In one embodiment of the invention, such a process may include the use of one or more frequencies according to Formula II that are solved by inputting an $A_{fr}$ into Formula II that corresponds to the base frequency of hydrogen ($H_{fr}$). Table I illustrates example frequencies of electromagnetic radiation for cleaving a covalent bond between a hydrogen atom and a second atom. As illustrated in Table I, the frequencies can range from the low gigahertz range through the petahertz range and beyond. Frequencies ranging from Yottahertz (yHz, on the order of $10^{-24}$ Hz) radiation through, and including, Yottahertz (Yhz, on the order of $10^{24}$ Hz) are contemplated. Other embodiments employ frequencies falling within ranges such as, by way of non-limiting examples, $10^{-10}$ Hz through $10^{10}$ Hz, $10^{-5}$ Hz through $10^5$ Hz, or $10^5$ Hz through $10^{20}$ Hz.

TABLE I

Exemplary Frequencies For Cleaving a Covalent Bond that Bonds a Hydrogen to Another Atom

| | |
|---|---|
| $H_{fr} \cdot \Phi^0 \cdot e \cdot 10^0$ | 3.861063144 GHz |
| $H_{fr} \cdot \Phi^1 \cdot e \cdot 10^0$ | 6.247331399 GHz |
| $H_{fr} \cdot \Phi^2 \cdot e \cdot 10^0$ | 10.10839454 GHz |
| $H_{fr} \cdot \Phi^3 \cdot e \cdot 10^0$ | 16.35572594 GHz |
| $H_{fr} \cdot \Phi^4 \cdot e \cdot 10^0$ | 26.46412048 GHz |
| $H_{fr} \cdot \Phi^5 \cdot e \cdot 10^0$ | 42.81984642 GHz |
| $H_{fr} \cdot \Phi^6 \cdot e \cdot 10^0$ | 69.2839669 GHz |
| $H_{fr} \cdot \Phi^7 \cdot e \cdot 10^0$ | 112.1038133 GHz |
| $H_{fr} \cdot \Phi^8 \cdot e \cdot 10^0$ | 181.3877802 GHz |
| $H_{fr} \cdot \Phi^9 \cdot e \cdot 10^0$ | 0.2934915935 THz |
| $H_{fr} \cdot \Phi^{10} \cdot e \cdot 10^0$ | 0.4748793737 THz |
| $H_{fr} \cdot \Phi^{11} \cdot e \cdot 10^0$ | 0.7683709672 THz |
| $H_{fr} \cdot \Phi^{12} \cdot e \cdot 10^0$ | 1.243250341 THz |

TABLE I-continued

Exemplary Frequencies For Cleaving a Covalent Bond that Bonds a Hydrogen to Another Atom

| | |
|---|---|
| $H_{fr} \cdot \Phi^{13} \cdot e \cdot 10^0$ | 2.011621308 THz |
| $H_{fr} \cdot \Phi^{14} \cdot e \cdot 10^0$ | 3.254871649 THz |
| $H_{fr} \cdot \Phi^{15} \cdot e \cdot 10^0$ | 5.266492956 THz |
| $H_{fr} \cdot \Phi^{16} \cdot e \cdot 10^0$ | 8.521364605 THz |
| $H_{fr} \cdot \Phi^{17} \cdot e \cdot 10^0$ | 13.78785756 THz |
| $H_{fr} \cdot \Phi^{18} \cdot e \cdot 10^0$ | 22.3092216 THz |
| $H_{fr} \cdot \Phi^{19} \cdot e \cdot 10^0$ | 36.09707972 THz |
| $H_{fr} \cdot \Phi^{20} \cdot e \cdot 10^0$ | 58.40630188 THz |
| $H_{fr} \cdot \Phi^{21} \cdot e \cdot 10^0$ | 94.50338158 THz |
| $H_{fr} \cdot \Phi^{22} \cdot e \cdot 10^0$ | 152.9096835 THz |
| $H_{fr} \cdot \Phi^{23} \cdot e \cdot 10^0$ | 247.413065 THz |
| $H_{fr} \cdot \Phi^{24} \cdot e \cdot 10^0$ | 0.4003227485 PHz |
| $H_{fr} \cdot \Phi^{25} \cdot e \cdot 10^0$ | 0.6477358136 PHz |
| $H_{fr} \cdot \Phi^{26} \cdot e \cdot 10^0$ | 1.048058562 PHz |
| $H_{fr} \cdot \Phi^{27} \cdot e \cdot 10^0$ | 1.695794376 PHz |
| $H_{fr} \cdot \Phi^{28} \cdot e \cdot 10^0$ | 2.743852938 PHz |
| $H_{fr} \cdot \Phi^{29} \cdot e \cdot 10^0$ | 4.439647313 PHz |
| $H_{fr} \cdot \Phi^{30} \cdot e \cdot 10^0$ | 7.18350025 PHz |
| $H_{fr} \cdot \Phi^{31} \cdot e \cdot 10^0$ | 11.62314756 PHz |
| $H_{fr} \cdot \Phi^{32} \cdot e \cdot 10^0$ | 18.80664781 PHz |

In some embodiments of the invention, bonds can be dissociated by exposing the bonds to electromagnetic radiation comprising a frequency according Formula II without any additional processes or steps. In other embodiments, the process of cleaving bonds by exposure to electromagnetic radiation having a frequency according to Formula II may be combined with another process known to be useful for breaking bonds, such as by way of a non-limiting example, electrolysis.

In one embodiment of the invention, the process for cleaving a covalent bond between a hydrogen atom and a second atom is used for cleaving the hydrogen-oxygen bonds in water. In the case of water, the hydrogen-oxygen bonds can be cleaved by directing electromagnetic radiation with at least one frequency according to Formula II at the bonds while also utilizing another method known to be useful in breaking the hydrogen-oxygen bonds of water, such as electrolysis, or by directing electromagnetic radiation with one or more frequencies according to Formula II at the water alone. Experimentation has shown that by exposing water to electromagnetic radiation according to Formula II, efficiency of electrolysis of the water increased by about 1,250% compared to electrolysis alone. More particularly, electrolysis of water combined with exposure of the water to electromagnetic radiation according to Formula II increased the volume of gas produced by 1,250% compared to electrolysis alone when conducted under otherwise identical conditions.

In some embodiments of the invention, the process of cleaving a bond between a first and second atom with electromagnetic radiation does not include a process of cleaving a silicon-hydrogen bond. In other embodiments of the invention, the process of cleaving a bond connecting a hydrogen to a second atom by exposing the bond to electromagnetic radiation according to Formula II does not include irradiation with electromagnetic radiation having a frequency of $6.2 \times 10^2$ THz (i.e., electromagnetic radiation having a wavelength of 4.8 microns). In still other embodiments of the invention, the process of cleaving a silicon-hydrogen bond by exposing the silicon-hydrogen bond to electromagnetic radiation according to Formula II does not include exposing the silicon-hydrogen bond to electromagnetic radiation having a frequency of $6.2 \times 10^2$ THz.

In another embodiment of the invention, a bond between an oxygen atom and a second atom can be cleaved by exposing the bond to electromagnetic radiation having a frequency according to Formula II. For cleaving a bond between an oxygen atom and a second atom, Formula II may be solved utilizing a base frequency for oxygen or for the atom to which oxygen is bonded. The base frequency of oxygen ($O_{fr}$) may be determined by inputting the maximum absorption wavelength ($\lambda_{max}$) for diatomic (molecular) oxygen ($O_2$) into Formula III. Because the maximum absorption wavelength of oxygen is 760 nm the base frequency of atmospheric, ground state triplet oxygen comprising $O_{16}$, $O_{17}$ and $O_{18}$ in atmospheric proportions ($O_{fr}$) is determined to be about 0.3947368421 PHz.

The process of cleaving a covalent bond between an oxygen atom and another atom may include directing electromagnetic radiation of one or more of the frequencies according to Formula II at a material having molecules with at least one covalent bond between an oxygen atom and another atom. In one embodiment of the invention, such a process may include the use of one or more frequencies according to Formula II that are solved by inputting a base frequency ($A_{fr}$) into Formula II that corresponds to the base frequency of oxygen ($O_{fr}$). Table II illustrates examples of electromagnetic radiation frequencies for cleaving a covalent bond between an oxygen atom and a second atom.

TABLE II

Exemplary Frequencies For Cleaving a Covalent Bond that Bonds an Oxygen to Another Atom

| | |
|---|---|
| $O_{fr} \cdot \Phi^{0} \cdot e \cdot 10^{0}$ | 1.073005985 PHz |
| $O_{fr} \cdot \Phi^{1} \cdot e \cdot 10^{0}$ | 1.736160154 PHz |
| $O_{fr} \cdot \Phi^{2} \cdot e \cdot 10^{0}$ | 2.809166138 PHz |
| $O_{fr} \cdot \Phi^{3} \cdot e \cdot 10^{0}$ | 4.545326292 PHz |
| $O_{fr} \cdot \Phi^{4} \cdot e \cdot 10^{0}$ | 7.35449243 PHz |
| $O_{fr} \cdot \Phi^{5} \cdot e \cdot 10^{0}$ | 11.89981872 PHz |
| $O_{fr} \cdot \Phi^{6} \cdot e \cdot 10^{0}$ | 19.25431115 PHz |
| $O_{fr} \cdot \Phi^{7} \cdot e \cdot 10^{0}$ | 31.15412987 PHz |
| $O_{fr} \cdot \Phi^{8} \cdot e \cdot 10^{0}$ | 50.40844102 PHz |
| $O_{fr} \cdot \Phi^{9} \cdot e \cdot 10^{0}$ | 81.56257087 PHz |
| $O_{fr} \cdot \Phi^{10} \cdot e \cdot 10^{0}$ | 131.9710119 PHz |
| $O_{fr} \cdot \Phi^{11} \cdot e \cdot 10^{0}$ | 213.5335827 PHz |
| $O_{fr} \cdot \Phi^{12} \cdot e \cdot 10^{0}$ | 345.5045946 PHz |
| $O_{fr} \cdot \Phi^{13} \cdot e \cdot 10^{0}$ | 559.0381773 PHz |
| $O_{fr} \cdot \Phi^{14} \cdot e \cdot 10^{0}$ | 904.5427719 PHz |
| $O_{fr} \cdot \Phi^{15} \cdot e \cdot 10^{0}$ | 1.463580949 EHz |
| $O_{fr} \cdot \Phi^{16} \cdot e \cdot 10^{0}$ | 2.368123721 EHz |
| $O_{fr} \cdot \Phi^{17} \cdot e \cdot 10^{0}$ | 3.83170467 EHz |
| $O_{fr} \cdot \Phi^{18} \cdot e \cdot 10^{0}$ | 6.199828391 EHz |
| $O_{fr} \cdot \Phi^{19} \cdot e \cdot 10^{0}$ | 10.03153306 EHz |
| $O_{fr} \cdot \Phi^{20} \cdot e \cdot 10^{0}$ | 16.23136145 EHz |
| $O_{fr} \cdot \Phi^{21} \cdot e \cdot 10^{0}$ | 26.26289451 EHz |
| $O_{fr} \cdot \Phi^{22} \cdot e \cdot 10^{0}$ | 42.49425596 EHz |
| $O_{fr} \cdot \Phi^{23} \cdot e \cdot 10^{0}$ | 68.75715046 EHz |
| $O_{fr} \cdot \Phi^{24} \cdot e \cdot 10^{0}$ | 111.2514064 EHz |
| $O_{fr} \cdot \Phi^{25} \cdot e \cdot 10^{0}$ | 180.0085569 EHz |
| $O_{fr} \cdot \Phi^{26} \cdot e \cdot 10^{0}$ | 291.2599633 EHz |
| $O_{fr} \cdot \Phi^{27} \cdot e \cdot 10^{0}$ | 471.2685202 EHz |
| $O_{fr} \cdot \Phi^{28} \cdot e \cdot 10^{0}$ | 762.5284835 EHz |
| $O_{fr} \cdot \Phi^{29} \cdot e \cdot 10^{0}$ | 1.233797004 ZHz |
| $O_{fr} \cdot \Phi^{30} \cdot e \cdot 10^{0}$ | 1.996325487 ZHz |
| $O_{fr} \cdot \Phi^{31} \cdot e \cdot 10^{0}$ | 3.23012249 ZHz |
| $O_{fr} \cdot \Phi^{32} \cdot e \cdot 10^{0}$ | 5.226447977 ZHz |
| $O_{fr} \cdot \Phi^{33} \cdot e \cdot 10^{0}$ | 8.456570467 ZHz |
| $O_{fr} \cdot \Phi^{34} \cdot e \cdot 10^{0}$ | 13.68301844 ZHz |
| $O_{fr} \cdot \Phi^{35} \cdot e \cdot 10^{0}$ | 22.13958891 ZHz |
| $O_{fr} \cdot \Phi^{36} \cdot e \cdot 10^{0}$ | 35.82260735 ZHz |
| $O_{fr} \cdot \Phi^{37} \cdot e \cdot 10^{0}$ | 57.96219626 ZHz |

It is contemplated that some embodiments of the invention include exposing a bond to electromagnetic radiation comprising multiple frequencies according to Formula II. In some embodiments of the invention, such frequencies may be obtained by solving Formula II for multiple values of n or m, or a combination thereof. In other embodiments of the invention, such frequencies may be obtained by solving Formula II for the base frequencies of each of the bonded atoms. That is, each electromagnetic radiation frequency may correspond to a different base frequency. In still other embodiments of the invention, such electromagnetic radiation frequencies may be determined by solving Formula II for the base frequencies of each of the bonded atoms and solving for various values of n or m, or a combination thereof, for each base frequency. For example, it is contemplated that in one embodiment of the invention, a hydrogen-oxygen bond can be irradiated with electromagnetic radiation comprising at least one frequency of Table I and at least one frequency of Table II.

In one embodiment of the invention, the frequencies of electromagnetic radiation utilized for cleaving a bond between a first and a second atom will correspond to at least one frequency of electromagnetic radiation according to Formula II solved for the base frequency of the first atom and at least one frequency of electromagnetic radiation according to Formula II solved for the base frequency of the second atom. In such embodiments, there are multiple, at least two, electromagnetic radiation frequencies utilized to cleave the bond. In some embodiments, the frequencies of electromagnetic radiation utilized to cleave a bond will be selected such that all frequencies selected are within 5% of largest frequency value selected. In other embodiments, the frequencies selected will all be within 10% of largest frequency value selected. In some embodiments of the invention, the bond between a first and second atom to be cleaved will be irradiated with a narrow band of electromagnetic radiation that includes the multiple frequencies of electromagnetic radiation selected according to the process described above. In other embodiments, the bond between a first and second atom to be cleaved will be irradiated with multiple specific electromagnetic radiation frequencies that correspond to the electromagnetic radiation frequencies selected according to the process described above.

Figure 3:
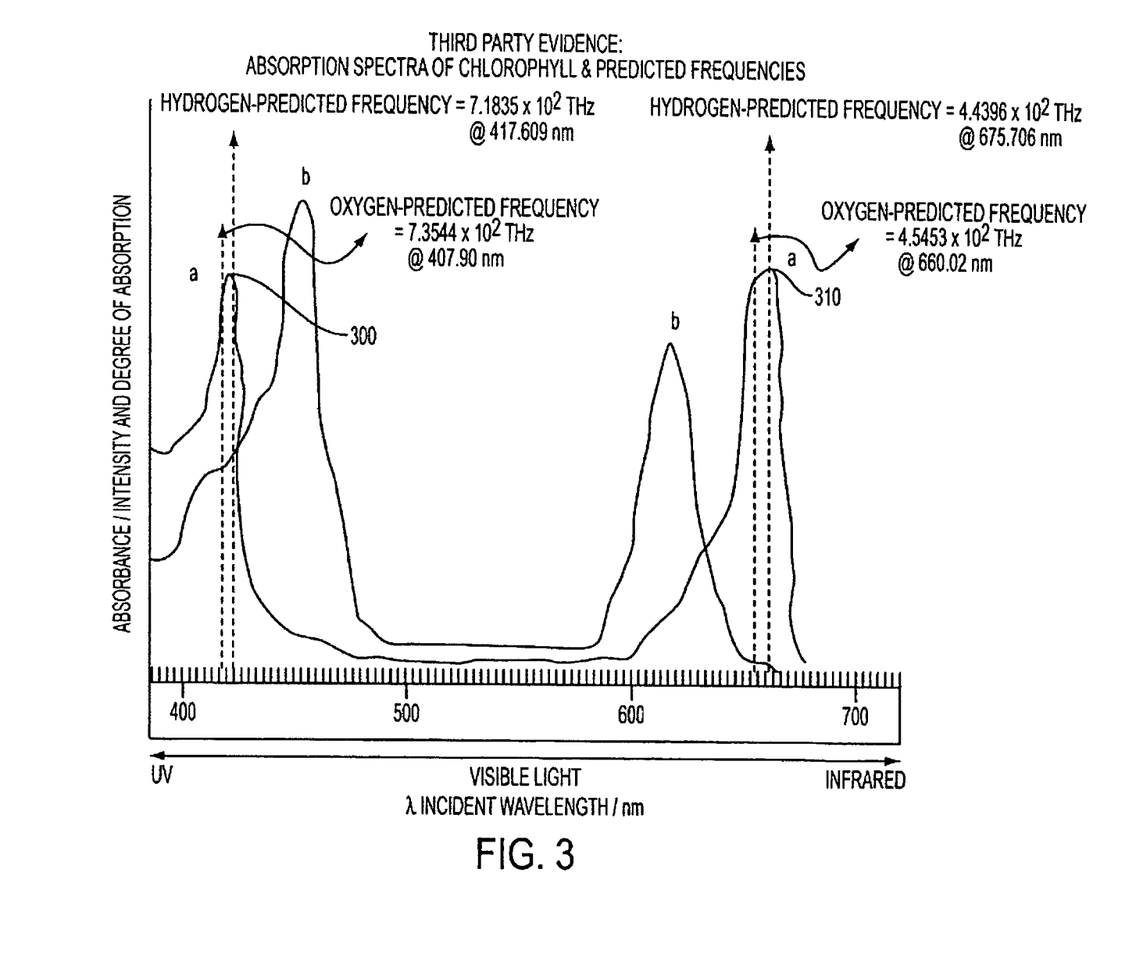
FIG. 3 illustrates a correlation between the maximum absorption frequencies of chlorophyll "a" and irradiation frequencies corresponding to hydrogen and oxygen atoms according to an embodiment of the invention.

FIG. 3 depicts the absorption maxima of chlorophyll "a", 300 and 310. Chlorophyll "a" is a photoreceptor that is known to absorb red and blue light, resulting in the initiation of the cleavage of water ($H_2O$) into hydrogen and oxygen, which then are used to begin a plant's production of carbohydrates. As illustrated in FIG. 3, when base frequency ($A_{fr}$) corresponds to the base frequency of hydrogen, Formula II predicts both the blue and the red wavelength absorption maxima of chlorophyll "a". Likewise, when base frequency ($A_{fr}$) corresponds to the base frequency of oxygen, Formula II also predicts both the blue and the red absorption wavelength maxima of chlorophyll "a". Therefore, this shows that Formula II accurately predicts the relationship between the base frequencies of hydrogen and oxygen and known biological realities.

In one embodiment of the invention, it is contemplated that cleavage of a bond between a first and second atom may be accomplished for a specific isotope of either or both of the first and second atoms. In such a process, a frequency of electromagnetic radiation according to Formula II may be determined utilizing a base frequency of a specific isotope of either the first or second atom. For example, the base frequency may be determined for hydrogen ($^1H$), deuterium ($^2H$) or tritium ($^3H$). Isotope selectivity may be desired in some embodiments for various reasons. For example, in an embodiment where the first or second atom is a hydrogen isotope, the process could be utilized to selectively cleave hydrogen, deuterium, or tritium in order to produce molecular hydrogen ($^1H_2$), molecular deuterium ($^2H_2$) or molecular tritium ($^3H_2$), respectively.

In one embodiment of the invention, it is contemplated that cleavage of a bond between a first atom and a second atom will be accomplished by irradiating the bond with electromagnetic radiation having a frequency according to Formula II, where Formula II is solved for the base frequency of the first or second atom with the smaller atomic mass. The atomic mass of an atom is the sum of the mass of the neutrons, protons and electrons of the atom.

Irradiating a bond utilizing a specific frequency or a narrow band of electromagnetic radiation is generally more efficient compared to the use of broad-band electromagnetic radiation for several reasons. By irradiating a bond with a specific frequency of electromagnetic radiation specifically selected to cleave the bond, instead of a broad-band of electromagnetic radiation, less energy is required to cleave the bond because energy will not be wasted on emitting frequencies that are ineffective at cleaving the desired bond. It is also contemplated that certain frequencies of electromagnetic radiation may adversely impact the desired bond cleavage. Accordingly, for at least these reasons, the use of specific frequencies of electromagnetic radiation facilitates bond cleavage with less energy requirements than would be required by broad-band irradiation.

Furthermore, utilization of a specific frequency of electromagnetic radiation for cleaving a bond between a first and second atom may be advantageous when it is desired to cleave a specific bond in a molecule that has more than two types of atoms. For example irradiation of methanol ($H_3COH$) with electromagnetic radiation having a frequency according to Formula II where the base frequency is the base frequency of hydrogen ($H_{fr}$) may be useful for cleaving the hydrogen-oxygen and the hydrogen-carbon bonds, while leaving the carbon-oxygen bond intact.

In one embodiment of the invention, a second process may be utilized in combination with a first process to facilitate bond cleavage (the first process being the application of electromagnetic radiation having a frequency according to Formula II). The second process is particularly useful when the material is a liquid. It is contemplated that the second process may be useful when, e.g., a liquid tends to form macrostructures or quasicrystals via non-covalent interactions, such as hydrogen bonding, van der Waals forces, etc. The second process involves subjecting the liquid to cavitation, such as in a spiral vortex, a pulsed magnetic field, or a combination thereof. In one embodiment, the magnetic field can be pulsed at at least one frequency that corresponds to Formula II.

The second process may be utilized in concert with the first process in order to increase the efficiency of bond cleavage by exposing the bonds which are to be cleaved to the electromagnetic radiation of the first process. The second process, if utilized in concert with the first process, may occur concurrently or sequentially with the first process. The second process may also be useful in facilitating other methods of bond cleavage, such as electrolysis.

Figure 4:
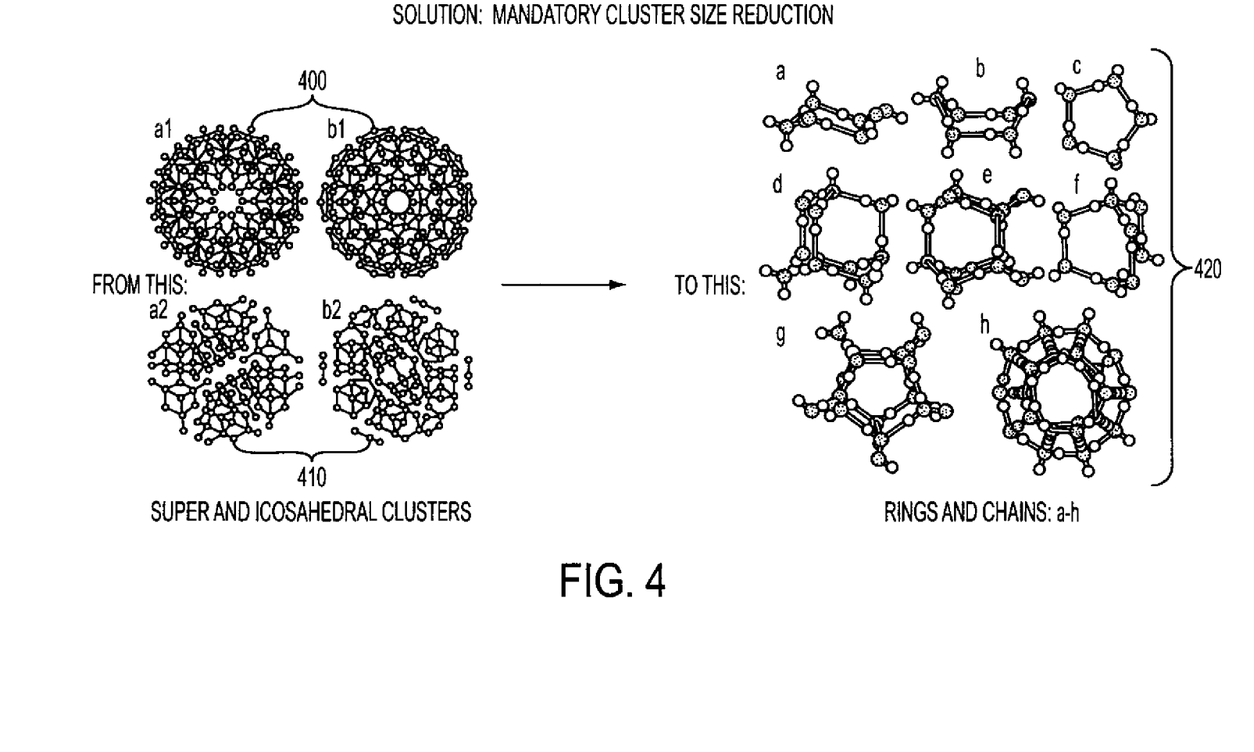
FIG. 4 illustrates cluster size reduction of water according to an embodiment of the invention.

FIG. 4 illustrates super 400 and icosahedral 410 water clusters, which may comprise hundreds or even thousands of water molecules. While not wishing to be bound by any theory of operation, it is believed that the formation of these clusters limits the number of covalent hydrogen-oxygen bonds that are exposed to the electromagnetic radiation of the first process. The "surface" of the cluster appears to block much of the electromagnetic radiation from entering the "interior" of the cluster. Therefore, it is believed that while the hydrogen-oxygen bonds that are on the "surface" of the cluster are exposed to the electromagnetic radiation, the hydrogen-oxygen bonds that are within the cluster are largely un-exposed and, thus, are not susceptible to electromagnetic-radiation-induced bond cleavage. It is also believed that when used with water, the second process breaks the large water clusters 400 and 410 into smaller water clusters 420, as schematically illustrated in FIG. 4. Because the smaller water clusters possess fewer water molecules, fewer hydrogen-oxygen bonds are shielded from the electromagnetic radiation by the "surface" of the cluster. Accordingly, when the macrostructure of the water molecules is in the form of small water clusters 420, the hydrogen-oxygen bonds are more exposed to electromagnetic radiation and more readily cleaved. Therefore, in one embodiment, the second process can be initially utilized to break the super 400 and icosahedral 410 clusters into smaller cluster sizes 420, followed by the first process utilized to cleave the bonds in the smaller clusters 420 Accordingly, the second process can be used in combination with the first process in a method of cleaving, e.g., the hydrogen-oxygen bond of water. In sum, as depicted in FIG. 4, breaking down the cluster sizes into manageable chains and rings by moving the water (a dipole molecule) through a pulsating magnetic flux retards ongoing re-configuration, aligning molecules as they are in ice, reducing H-bonding possibilities without freezing. Once aligned, continuing pulsation of magnetic flux within increasingly smaller cavities causes cavitation, systematically breaking down molecules further without chance of molecular reconstituting or reformation (i.e., large clusters are not reformed).

Figure 5:
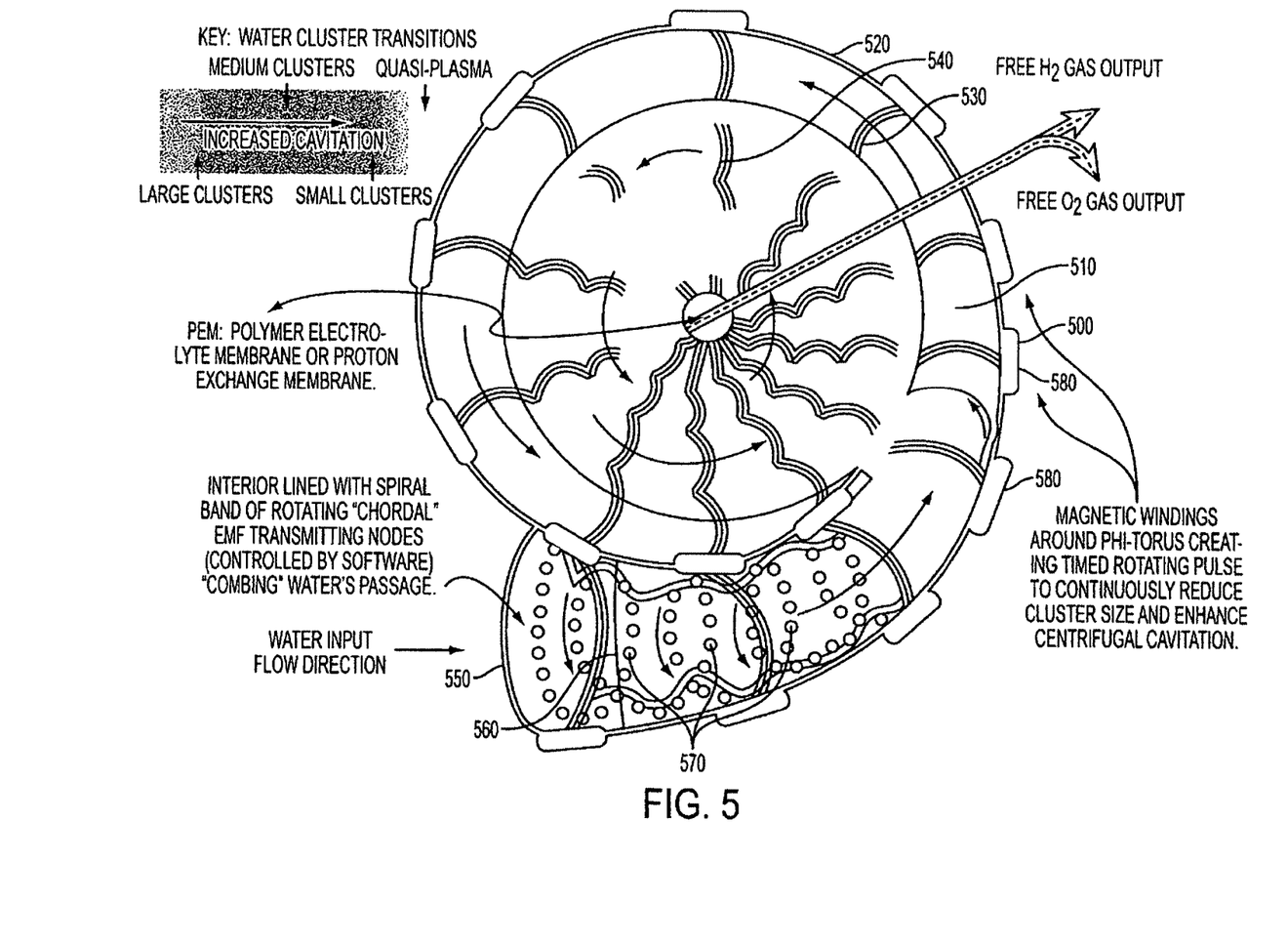
FIG. 5 illustrates an apparatus for reducing the size of macrostructures of a fluid and for irradiating a bond between a first and second atom with electromagnetic radiation according to an embodiment of the invention.

FIG. 5 illustrates an embodiment of the invention which combines a first process (the application of electromagnetic radiation having at least one frequency of Formula II) with a second process (facilitation of bond cleavage by exposure of the water to cavitation and a pulsed magnetic field). FIG. 5 illustrates an apparatus 500 comprising a coiled cylindrical body 510. Although the invention is not limited to such an embodiment, the coiled cylindrical body depicted in FIG. 5 proceeds from an outer coil 520 to an inner coil 530. As the coiled body 510 proceeds from the outer coil 520 to the inner coil 530, the diameter of the coil 540 becomes progressively smaller. At the open end of the outer coil, the interior of the coiled cylindrical body is accessible via the mouth 550 of the cylinder. In some embodiments, as the coiled body proceeds from the outer coil 520 to the inner coil 530, the diameter of the cylindrical portion of the body 560 becomes progressively smaller. Furthermore, in some embodiments, the interior of the cylindrical body is lined with a coil of electromagnetic transmitting nodes 570. The electromagnetic transmitting nodes 570 may emit electromagnetic radiation having one or more frequencies according to Formula II, including frequencies obtained by plugging the base frequencies of one or both of the atoms involved in the bond that is to be cleaved into Formula II. In some embodiments of the invention, different electromagnetic frequencies of Formula II are transmitted by different portions of the electromagnetic transmitting nodes 570. In other embodiments of the invention, the electromagnetic frequencies transmitted by the electromagnetic transmitting nodes 570 may not be the same throughout the entire process. In other words, if desired, the electromagnetic transmitting nodes 570 at specific points along the interior of the coiled cylindrical body may change the frequency of electromagnetic radiation transmitted. Furthermore, although the invention is not so limited, the apparatus of FIG. 5 comprises magnetic windings 580 that are spaced intermittently along the coiled cylindrical body. In another embodiment of the invention, the magnetic windings may be continuously placed along the coiled cylindrical body.

In one embodiment of the invention, the apparatus of FIG. 5 can be utilized in a method for cleaving the hydrogen-oxygen bonds of water. The method can be utilized, e.g., for generating hydrogen gas ($H_2$) and oxygen gas ($O_2$). Water can be introduced into the mouth 550 of the apparatus whereby it will become subject to the electromagnetic frequencies according to Formula II being transmitted by the electromagnetic transmitting nodes 570 found within the interior of the coiled cylindrical body 510. As the water flows inward inside the coiled cylindrical body 510, the large water clusters, such as super 400 and icosahedral 410 clusters, will be broken into smaller clusters 420 because of, e.g., (1) the spiraling flow or "vortex" of the water; (2) the decreasing diameter of the cylindrical body; and (3) the magnetic pulsation of the magnetic coils. The hydrogen-oxygen bonds of water in the smaller clusters 420 will then be more susceptible to bond cleavage induced by the electromagnetic radiation transmitted by the electromagnetic transmitting nodes 570. In various embodiments of the invention, the use of any manner of breaking large water clusters into smaller clusters is contemplated, including those recited herein, and any other known method of breaking large water clusters into smaller clusters, or any combinations thereof.

Furthermore, it is contemplated that in some embodiments of the invention, a method of cleaving bonds comprising the first and second processes may further be combined with another process known to be useful in cleaving bonds. For example, electrolysis is known to convert $H_2O$ to $H_2$ and $O_2$. Accordingly, the first and second processes may be used to increase the efficiency of electrolysis. Using a broad-band electromagnetic frequency generator, electrolysis of water was observed to increase by about 1,250% when compared to electrolysis alone.

In some embodiments of the invention, the process of affecting an atom or a molecule by exposing the atom or molecule to electromagnetic radiation having a frequency according to Formula II may be accelerated or retarded by additionally irradiating the atom or molecule with electromagnetic radiation with a frequency according to Formula IV, electromagnetic radiation with a frequency according to Formula V, or a combination thereof. Formula IV and Formula V are described below. In other embodiments, electromagnetic radiation having a frequency according to either or both of Formula IV and Formula V may be utilized, independent of electromagnetic radiation having a frequency according to Formula II, in order to cause elements, atoms, compounds, or a combination thereof, to be more or less reactive. Formula IV and Formula V may affect energy states and bonding potentials of all atomic matter, such as by affecting electron orbitals of elements, atoms, compounds or a combination thereof.

$$v''=v \cdot e^{-Lt-1} \cdot 10^m = A_{fr} \cdot \Phi^n \cdot e^{-Lt} \cdot 10^m \quad \text{Formula IV.}$$

In Formula IV, the term $v''$ is the frequency of electromagnetic radiation useful for accelerating or retarding the rate of the process of affecting the atom or the molecule by exposing the atom or molecule to electromagnetic radiation having a frequency according to Formula II. In some embodiments, the process to be accelerated or retarded may be a process of cleaving bonds between a first and a second atom. The term $A_{fr}$ represents the base frequency of one of the atoms that is bonded. A base frequency of one of the first or second atoms is a spectroscopic parameter associated with that atom. The spectroscopic parameter may be, by way of non-limiting example, a frequency corresponding to the maximum wavelength of absorption ($\lambda_{max}$) for the molecular form of that atom and may be determined according to Formula III. The symbol $\Phi$ represents the golden mean, equal to $\frac{1}{2}(1+\sqrt{5})$. The variables n and m may be any integer, including negative integers, positive integers and zero, and may be the same or different. The constant e is defined as the base for natural logs, equal to about 2.71828. The constant L is defined as the natural log of the number two, equal to about 0.693. The variable t is equal to the variable n. In some embodiments, the variable n is a negative number when the electromagnetic radiation frequency according to Formula IV is utilized to retard the process of affecting an atom or molecule with electromagnetic radiation having a frequency according to Formula II. In other embodiments, the variable n is a negative number when the electromagnetic radiation frequency according to Formula IV is utilized to make an atom, element or molecule less reactive. In some embodiments, the variable n is a positive number when the electromagnetic radiation frequency according to Formula IV is utilized to accelerate the process of affecting an atom or molecule with electromagnetic radiation having a frequency according to Formula II. In other embodiments, the variable n is a positive number when the electromagnetic radiation frequency according to Formula IV is utilized to make an atom, element or molecule more reactive.

In some embodiments, the frequencies ($v''$) of electromagnetic radiation according to Formula IV fall within, and include, the range of yoctaherz (yHz, on the order of $10^{-24}$ Hz) and yottahertz (Yhz, on the order of $10^{24}$ Hz). Other embodiments employ frequencies falling within ranges such as, by way of non-limiting examples, $10^{-10}$ Hz through $10^{10}$ Hz, $10^{-5}$ Hz through $10^{5}$ Hz, or $10^{5}$ Hz through $10^{20}$ Hz. Note that in certain embodiments, both $v$ (according to Formula I) and $v''$ fall within these ranges. That is, once values for $v$ are calculated according to Formula I that fall within a given range, then additional orders of magnitude of $v$, calculated as $v''$ according to Formula IV, may be calculated such that they still lie within the given range.

$$v'''=(v \cdot L^{-1}) \cdot 10^m e^{-L-1} = (A_{fr} \cdot \Phi^n \cdot L^{-1}) \cdot 10^m e^{-L} \quad \text{Formula V.}$$

In Formula V, the term $v'''$ is the frequency of electromagnetic radiation useful for accelerating or retarding the rate of the process of affecting an atom or a molecule by exposing the atom or molecule to electromagnetic radiation having a frequency according to Formula V. In some embodiments, the process to be accelerated or retarded may be a process of cleaving bonds between a first and a second atom. The term $A_{fr}$ represents the base frequency of one of the atoms that is bonded. A base frequency of one of the first or second atoms is a spectroscopic parameter associated with that atom. The spectroscopic parameter may be, by way of non-limiting example, a frequency corresponding to the maximum wavelength of absorption ($\lambda_{max}$) for the molecular form of that atom and may be determined according to Formula III. The symbol $\Phi$ represents the golden mean, equal to $\frac{1}{2}(1+\sqrt{5})$. The variables n and m may be any integer, including negative integers, positive integers and zero, and may be the same or different. The constant e is defined as the base for natural logs, equal to about 2.71828. The constant L is defined as the natural log of the number two, equal to about 0.693. In some embodiments, the variable n is a negative number when the electromagnetic radiation frequency according to Formula V is utilized to retard the process of affecting an atom or molecule with electromagnetic radiation having a frequency according to Formula II. In other embodiments, the variable n is a negative number when the electromagnetic radiation frequency according to Formula V is utilized to make an atom, element or molecule less reactive. In some embodiments, the variable n is a positive number when the electromagnetic radiation frequency according to Formula V is utilized to accelerate the process of affecting an atom or molecule with electromagnetic radiation having a frequency according to Formula II. In other embodiments, the variable n is a positive number when the electromagnetic radiation frequency according to Formula V is utilized to make an atom, element or molecule more reactive.

In some embodiments, the frequencies (v''') of electromagnetic radiation according to Formula V fall within, and include, the range of yoctaherz (yHz, on the order of $10^{-24}$ Hz) and yottahertz (Yhz, on the order of $10^{24}$ Hz). Other embodiments employ frequencies falling within ranges such as, by way of non-limiting examples, $10^{-10}$ Hz through $10^{10}$ Hz, $10^{-5}$ Hz through $10^{5}$ Hz, or $10^{5}$ Hz through $10^{20}$ Hz. Note that in certain embodiments, both v (according to Formula I) and v''' fall within these ranges. That is, once values for v are calculated according to Formula I that fall within a given range, then additional orders of magnitude of v, calculated as v''' according to Formula V, may be calculated such that they still lie within the given range.

In some embodiments, simultaneous exposure of the bond to multiple electromagnetic radiation frequencies falling within the scope of Formula IV or Formula V, or a combination thereof, may be utilized. Multiple electromagnetic radiation frequencies may be determined by solving either or both of Formulas IV and V for multiple values of n and/or m. Such multiple frequencies of electromagnetic radiation may further be determined according to either or both of Formulas IV and V by inputting the base frequency parameter $A_{fr}$ for each bonded atom. It is contemplated that two, three or up to eight or more frequencies (v'' and/or v''') may be used to accelerate or retard a process of affecting an atom or a molecule by exposing the atom or molecule to electromagnetic radiation having a frequency according to Formula II.

In one embodiment of the invention, a hydrogen-containing covalent bond is irradiated with at least one electromagnetic radiation frequency according to Formula II, solved for a base frequency of hydrogen, and at least one electromagnetic radiation frequency according to either or both of Formulas IV and V, solved for a base frequency of hydrogen. Exemplary frequencies of electromagnetic radiation according to Formulas IV and V solved for the base frequency of hydrogen are illustrated in Table IV and Table V, respectively.

TABLE III

Exemplary Frequencies According to Formula IV for Accelerating or Retarding the Cleavage of a Bond Between a Hydrogen Atom and Another Atom

| | |
|---|---|
| $H_{fr} \cdot \Phi^{-8} \cdot e^{(-L \cdot -8)} \cdot 10^0$ | 7.731665658 GHz |
| $H_{fr} \cdot \Phi^{-7} \cdot e^{(-L \cdot -7)} \cdot 10^0$ | 6.255909898 GHz |
| $H_{fr} \cdot \Phi^{-6} \cdot e^{(-L \cdot -6)} \cdot 10^0$ | 5.06183407 GHz |
| $H_{fr} \cdot \Phi^{-5} \cdot e^{(-L \cdot -5)} \cdot 10^0$ | 4.095673463 GHz |
| $H_{fr} \cdot \Phi^{-4} \cdot e^{(-L \cdot -4)} \cdot 10^0$ | 3.313925523 GHz |
| $H_{fr} \cdot \Phi^{-3} \cdot e^{(-L \cdot -3)} \cdot 10^0$ | 2.681391099 GHz |
| $H_{fr} \cdot \Phi^{-2} \cdot e^{(-L \cdot -2)} \cdot 10^0$ | 2.169589563 GHz |
| $H_{fr} \cdot \Phi^{-1} \cdot e^{(-L \cdot -1)} \cdot 10^0$ | 1.75547643 GHz |
| $H_{fr} \cdot \Phi^{0} \cdot e^{(-L \cdot 0)} \cdot 10^0$ | 1.420405752 GHz |
| $H_{fr} \cdot \Phi^{1} \cdot e^{(-L \cdot 1)} \cdot 10^0$ | 1.149301534 GHz |
| $H_{fr} \cdot \Phi^{2} \cdot e^{(-L \cdot 2)} \cdot 10^0$ | 0.929941332 GHz |
| $H_{fr} \cdot \Phi^{3} \cdot e^{(-L \cdot 3)} \cdot 10^0$ | 0.752449079 GHz |
| $H_{fr} \cdot \Phi^{4} \cdot e^{(-L \cdot 4)} \cdot 10^0$ | 0.608833694 GHz |
| $H_{fr} \cdot \Phi^{5} \cdot e^{(-L \cdot 5)} \cdot 10^0$ | 0.492629306 GHz |
| $H_{fr} \cdot \Phi^{6} \cdot e^{(-L \cdot 6)} \cdot 10^0$ | 0.398604143 GHz |
| $H_{fr} \cdot \Phi^{7} \cdot e^{(-L \cdot 7)} \cdot 10^0$ | 0.322524991 GHz |

TABLE III-continued

Exemplary Frequencies According to Formula IV for Accelerating or Retarding the Cleavage of a Bond Between a Hydrogen Atom and Another Atom

| | |
|---|---|
| $H_{fr} \cdot \Phi^{8} \cdot e^{(-L \cdot 8)} \cdot 10^0$ | 0.260966605 GHz |
| $H_{fr} \cdot \Phi^{9} \cdot e^{(-L \cdot 9)} \cdot 10^0$ | 0.211157495 GHz |

TABLE IV

Exemplary Frequencies According to Formula V for Accelerating or Retarding the Cleavage of a Bond Between a Hydrogen Atom and Another Atom

| | |
|---|---|
| $H_{fr} \cdot \Phi^{1} \cdot e^{(-L \cdot 1)} \cdot 10^0$ | 1.660640437 GHz |
| $H_{fr} \cdot \Phi^{2} \cdot e^{(-L \cdot 1)} \cdot 10^0$ | 2.68697267 GHz |
| $H_{fr} \cdot \Phi^{3} \cdot e^{(-L \cdot 1)} \cdot 10^0$ | 4.347613107 GHz |
| $H_{fr} \cdot \Phi^{4} \cdot e^{(-L \cdot 1)} \cdot 10^0$ | 7.03458577 GHz |
| $H_{fr} \cdot \Phi^{5} \cdot e^{(-L \cdot 1)} \cdot 10^0$ | 11.38219888 GHz |
| $H_{fr} \cdot \Phi^{6} \cdot e^{(-L \cdot 1)} \cdot 10^0$ | 18.41678466 GHz |
| $H_{fr} \cdot \Phi^{7} \cdot e^{(-L \cdot 1)} \cdot 10^0$ | 29.79898354 GHz |
| $H_{fr} \cdot \Phi^{8} \cdot e^{(-L \cdot 1)} \cdot 10^0$ | 48.2157682 GHz |
| $H_{fr} \cdot \Phi^{24} \cdot e^{(-L \cdot 1)} \cdot 10^0$ | 0.1064121785 PHz |
| $H_{fr} \cdot \Phi^{25} \cdot e^{(-L \cdot 1)} \cdot 10^0$ | 0.1721785217 PHz |
| $H_{fr} \cdot \Phi^{26} \cdot e^{(-L \cdot 1)} \cdot 10^0$ | 0.2785907002 PHz |
| $H_{fr} \cdot \Phi^{27} \cdot e^{(-L \cdot 1)} \cdot 10^0$ | 0.450762218 PHz |
| $H_{fr} \cdot \Phi^{28} \cdot e^{(-L \cdot 1)} \cdot 10^0$ | 0.7293599219 PHz |
| $H_{fr} \cdot \Phi^{29} \cdot e^{(-L \cdot 1)} \cdot 10^0$ | 1.180129144 PHz |
| $H_{fr} \cdot \Phi^{30} \cdot e^{(-L \cdot 1)} \cdot 10^0$ | 1.909489066 PHz |
| $H_{fr} \cdot \Phi^{31} \cdot e^{(-L \cdot 1)} \cdot 10^0$ | 3.089618209 PHz |
| $H_{fr} \cdot \Phi^{32} \cdot e^{(-L \cdot 1)} \cdot 10^0$ | 4.999107274 PHz |

In some embodiments, at least one narrow band of electromagnetic frequencies comprising at least one frequency of electromagnetic radiation selected from Formula II and at least one frequency of electromagnetic radiation frequency according to either or both of Formula IV and V is utilized to affect an atom or a molecule. In other embodiments, multiple specific frequencies corresponding to at least one frequency of electromagnetic radiation corresponding to Formula II and at least one frequency of electromagnetic radiation corresponding to either or both of Formulas IV and V are used. In some embodiments the frequencies of electromagnetic radiation selected are selected such that the radiation corresponding to the at least one frequency of Formula II and the frequencies of electromagnetic radiation corresponding to either or both of Formulas IV and V are all within 5% of the largest frequency selected. In other embodiments, the frequencies of Formula II and either or both of Formulas IV and V are all within 10% of the largest frequency selected.

The following formulas (VI-VIII) may be useful in some embodiments for attenuating EMFs and cancelling possible aberrant feedback or cavitation waves during processing. Note that, as discussed in detail above, $v_p = A_{fr} \cdot \Phi^{\pm n} \cdot e^x \cdot 10^{\pm m}$.

$$\int dy = \int A_{fr} \cdot \Phi^{\pm n} \cdot e^x \cdot de \qquad \text{Formula VI.}$$

$$\int dy = A_{fr} \cdot \Phi^{\pm n} \int e^x \cdot de$$

$$\int dy = A_{fr} \cdot \Phi^{\pm n} \cdot e^x \cdot 10^{\pm m} + c, \text{ since } \int e^x \cdot de = e^x + c, \text{ wherein } x-1, e=2.718 \ldots \text{ and } c=0.$$

$$\int dy = A_{fr} \int (\Phi^{\pm n} \cdot e^x) dx \qquad \text{Formula VII}$$

$$\int dy = \frac{A_{fr} \cdot e^{(\ln(\Phi)+1)x}}{\ln(\Phi) + 1} + c.$$

-continued $$\int dy = A_{fr} \cdot e^x \int \Phi^{\pm n} \cdot d\Phi, \quad \text{Formula VIII}$$

where $$\int \Phi^{\pm n} = \frac{\Phi^{\pm n}}{\ln(\Phi)} + c$$

$$\int dy = \frac{(A_{fr} \cdot e^x)\Phi^{\pm n}}{\ln(\Phi)} + c.$$

The processes of the various embodiments of the invention have varied practical applicability.

In various embodiments of the invention, the process of irradiating a bond with electromagnetic radiation having a frequency according to Formula II may be achieved for any chemical bond, including those in organic and inorganic compounds, and metal alloys. For example, the process may be used to cleave water bonds, including the water bonds of seawater. As a result, in one embodiment of the invention, a process of desalinating seawater is envisioned. Seawater may be irradiated with at least one frequency of electromagnetic radiation according to Formula II, thereby creating hydrogen and oxygen. The hydrogen and oxygen may then be reacted with one another to prepare desalinated water.

In other embodiments of the invention, the process of irradiating bonds with at least one frequency of electromagnetic radiation according to Formula II may be used to cleave the bonds of, by way of non-limiting example, hydrocarbons, alumina (including transparent alumina), hydrogenated silicon, and steel alloys.

In one embodiment of the invention, simple cleavage and dissociation of water into its elemental constituents of hydrogen and oxygen, and in turn into molecular hydrogen and oxygen, can be utilized to prepare hydrogen gas as fuel on demand. In some embodiments, the process of preparing hydrogen gas and oxygen gas can be used to power combustion engines for transportation, such as in an internal combustion engine of an automobile. In other embodiments, the hydrogen and oxygen can be combusted to create electricity for fuel cell technology or in generators for producing electricity. It is contemplated that such embodiments are useful for powering, by way of non-limiting examples, automobiles, personal generators, and utility plants. It is also conceived that the hydrogen and oxygen gases produced by way of the invention can be used in various heating applications.

The combustion of hydrogen gas prepared according to the processes of the invention is advantageous because the hydrogen gas is prepared from an abundant resource: water. Furthermore, the combustion of hydrogen gas is advantageous because it does not produce the byproducts associated with the combustion of fossil fuels. The combustion of hydrogen gas produces only water vapor whereas the combustion of fossil fuels can create, among others, carbon dioxide, carbon monoxide, carbon soot and various hydrocarbons.

In another embodiment of the invention, cleavage and dissociation of water into its elemental constituents of hydrogen and oxygen can be utilized to desalinate or purify seawater or polluted water, respectively. The hydrogen and oxygen gases produced from water by the processes of the invention can be reacted with one another to produce water free of salt and contaminants. In such a manner, purified, desalinated water could be provided on a scale hitherto thought impossible.

In another embodiment of the invention, the process of cleaving selected bonds can be used in various industrial applications, particularly in purification and cleaning processes. By selecting a frequency according to Formula II that corresponds to at least one atom bonded to another in a contaminant and irradiating a contaminated object with electromagnetic radiation having such a frequency, processes of the invention can be utilized to clean or purify the contaminated object. It is also contemplated that the processes of the invention can be used in methods of toxic waste and chemical cleanup.

In one specific embodiment, the process can be utilized to clean an oil spill. Because oil primarily consists of hydrocarbons, the cleaning of an oil spill can be achieved, for example, by selecting at least one frequency of electromagnetic radiation according to Formula II solved for a base frequency of carbon and irradiating the oil spill site with the selected frequency or frequencies. As the carbon-carbon and carbon-hydrogen bonds are cleaved by the irradiation process, volatile hydrocarbons, short chain alcohols, etc. will be formed and will evaporate and/or dissolve.

In certain embodiments of the invention, Formula II is solved for electromagnetic radiation frequencies suitable for strengthening bonds or forming (creating) bonds between a first and a second atom. It is contemplated that the same frequency of electromagnetic radiation utilized to form the bond may also serve to strengthen the same bond. The meanings of the terms in Formula II are as described above for affecting an atom or molecule, generally, as are the techniques for determining the value of the terms to be used in Formula II. In order to strengthen or create a bond between two atoms, Formula II may be solved utilizing a base frequency of the either or both of the first and the second atoms. In order to achieve bond strengthening or bond formation, either or both of the first and second atoms are irradiated with at least one frequency of electromagnetic radiation solved according to Formula II. The irradiation of either or both of the first and second atoms is intended to encompass irradiation of either or both of the first and second atoms that are not bonded to one another as well as either or both of the first and second atoms wherein the first and second atoms are bonded. In certain embodiments, a method of strengthening and/or forming a bond will be achieved by irradiating either or both of the first and second atoms with a frequency of electromagnetic radiation according to Formula II wherein the variable n is a negative integer. The irradiation of either or both of the first and second atoms may be achieved by utilizing a specific frequency of electromagnetic radiation according to Formula II or at least one narrow band of frequencies of electromagnetic radiation encompassing at least the specific frequency of electromagnetic radiation according to Formula II. Furthermore, bond strengthening or bond formation of specific isotopes may be achieved by irradiating either or both of the first and second atoms with an electromagnetic radiation frequency corresponding to a base frequency corresponding to a specific isotope of either or both the first and second atoms.

Formula II may be used to calculate a finite number of specific values of electromagnetic frequencies for each type of atom (i.e. each element). From this finite number of electromagnetic frequencies, a technician with the aid of a tunable electromagnetic radiation frequency generator will be able to simply tune through the given predetermined electromagnetic frequencies corresponding to Formula II for the specific type of atom selected and observe and record which select electromagnetic frequency or frequencies are suitable for bond strengthening or bond formation. Such a technician may simply observe the material for signs of bond strengthening or formation in a number of manners, including by way of non-limiting example observation of precipitate, change in color, change in spectrographic parameters, change in isotropic or allotropic formation, and change in material state of molecule.

Multiple frequencies of electromagnetic radiation according to Formula II may be useful for facilitating bond strengthening or bond formation. Multiple frequencies of electromagnetic radiation for bond strengthening or bond formation may be determined by solving Formula II for the base frequencies of both the first and second atoms. Multiple frequencies of electromagnetic radiation according to Formula II may be determined by solving Formula II for multiple values of n or m, or a combination thereof. The process of bond strengthening and/or bond formation via irradiation of the first and/or second atom with at least one frequency of electromagnetic radiation solved according to Formula II may be accelerated or retarded by also irradiating the first and/or second atom with at least one frequency of electromagnetic radiation according to either or both of Formulas IV and V.

In some embodiments of the invention, when multiple frequencies of electromagnetic radiation are utilized for strengthening or forming bonds, at least one electromagnetic frequency according to Formula II, as well as any electromagnetic radiation frequencies of either or both of Formulas IV and V utilized, are selected such that all frequencies selected are within 5% of largest frequency value selected. In other embodiments, the frequencies selected will all be within 10% of largest frequency value selected. In some embodiments of the invention, the strengthening or formation of a bond will be achieved by irradiating either or both of the first and second atom with a narrow band of electromagnetic radiation that includes all, some or one of the multiple frequencies of electromagnetic radiation used. In other embodiments, the strengthening or formation of a bond will be achieved by irradiating either or both of the first and second atom with the specific electromagnetic radiation frequencies selected therefor.

In certain embodiments of the invention, the method of affecting an atom and/or a molecule by exposing the atom or molecule to electromagnetic radiation involves electromagnetic radiation that may be used to mimic molecules, the molecules having at least a first atom bonded to a second atom. The first and second atoms may be bonded, by way of non-limiting example, via covalent and ionic bonds. In order to mimic a molecule, electromagnetic radiation having at least one frequency according to Formula II is directed at a medium. The medium may be of any sort, including solids, liquids and gases. As a result of being exposed to the at least one frequency of electromagnetic radiation according to Formula II, the medium behaves as though the molecule mimicked is present in the medium. The meaning of the terms found within Formula II are as described above for affecting atoms or bonds, generally, as are the techniques for determining the value of the terms to be used in Formula II. In order to mimic a molecule, Formula II may be solved utilizing a base frequency of either or both of the first and the second atoms of the molecule to be mimicked.

In order to mimic a molecule, a medium may be irradiated with at least one frequency of electromagnetic radiation solved according to Formula II. The irradiation of the medium may be achieved by utilizing a specific frequency of electromagnetic radiation according to Formula II or a narrow band of frequencies of electromagnetic radiation encompassing the specific frequency of electromagnetic radiation according to Formula II. Furthermore, mimicking of molecules comprising specific isotopes may be achieved by irradiating the medium with an electromagnetic radiation frequency corresponding to a base frequency of a specific isotope of either or both of the first and second atoms.

Multiple frequencies of electromagnetic radiation according to Formula II may be useful for mimicking a molecule. Multiple frequencies of electromagnetic radiation useful for mimicking a molecule may be determined by solving Formula II for the base frequencies of both the first and second atoms and/or may be determined by solving Formula II for multiple values of n or m, or a combination thereof. The process of mimicking a molecule with at least one frequency of electromagnetic radiation solved according to Formula II may be augmented (i.e. the mimicking effect is increased) or reduced (i.e. the mimicking effect is decreased) by also irradiating the material with at least one frequency of electromagnetic radiation according to either or both of Formulas IV and V.

In some embodiments of the invention, when multiple frequencies of electromagnetic radiation are utilized to mimic a molecule, the multiple electromagnetic frequencies according to Formula II are selected such that all frequencies selected are within 5% of largest frequency value selected. In other embodiments, the frequencies selected will all be within 10% of largest frequency value selected.

In certain embodiments of the invention, the mimicking of a molecule will be achieved by irradiating the medium with multiple frequencies of electromagnetic radiation according to Formula II. In some embodiments, the medium will be irradiated with at least one narrow band of electromagnetic radiation that includes all, some or one of the multiple frequencies of electromagnetic radiation used. In other embodiments, the mimicking of a molecule will be achieved by irradiating the medium with the specific electromagnetic radiation frequencies selected therefor.

In certain embodiments of the invention, the molecules mimicked are catalysts. Accordingly, by mimicking a catalyst, it is envisioned that the irradiation of a reaction mixture will cause a reaction to proceed as if the catalyst were present. In other embodiments of the invention, the mimicked molecule is an electrolyte. When the mimicked molecule is an electrolyte, the electrolysis of the solution irradiated by a frequency of electromagnetic radiation according to Formula II is facilitated and progresses as it would if the electrolyte mimicked were present. In other embodiments of the invention, the mimicked molecule is a solute. When the mimicked molecule is a solute, the irradiation of the solution with a frequency of electromagnetic radiation according to Formula II comprising the solute may cause the solution to behave as though the solution is saturated and cause the mimicked solute to precipitate.

In general, the frequencies of electromagnetic radiation within the scope of the invention useful for affecting an atom and/or a molecule by exposing the atom or molecule to electromagnetic radiation, including bond cleavage, fall within the range between, and including, Yottahertz ($10^{-24}$ Hz) and Yottahertz ($10^{24}$ Hz). Other embodiments employ frequencies falling within ranges such as, by way of non-limiting examples, $10^{-10}$ Hz through $10^{10}$ Hz, $10^{-5}$ Hz through $10^5$ Hz, or $10^5$ Hz through $10^{20}$ Hz.

The frequency of the electromagnetic radiation utilized to affect an atom or molecule may be calculated to be accurate to nine significant digits. In other embodiments, the frequency of the electromagnetic radiation may be calculated to be accurate to any of three, four, five, six or seven significant digits. In yet other embodiments of the invention, the electromagnetic radiation having a frequency of Formula II may comprise a narrow band of electromagnetic radiation that includes the frequency determined by Formula II. In yet other embodiments, a material may be irradiated with electromagnetic radiation, where the electromagnetic radiation consists of electromagnetic radiation having a particular frequency, where the electromagnetic radiation consists essentially of electromagnetic radiation having a particular frequency, or where the electromagnetic radiation comprises electromagnetic radiation having a particular frequency.

EXAMPLE

Water was disassociated into molecular hydrogen and molecular oxygen according to the parameters illustrated in Table V below. As demonstrated below, the disassociation of the water was enhanced by the application of electromagnetic radiation to the water concurrently with a current.

TABLE V

Comparison of Disassociation of Water with Current Versus Disassociation of Water that is Exposed to Both Current and Electromagnetic Radiation of Formula II.

|  | Comparative Example | Enhanced Disassociation |
|---|---|---|
| Electromagnetic Frequency | none | variable 30-60 KHz |
| Current | 0.4 amps | 0.4 amps |
| Potential | 9.8 volts | 9.8 volts |
| Area of the electrode | 251 in$^2$ | 251 in$^2$ |
| Number of plates per electrode | 23 | 23 |
| Size of each electrode plate | 44.70 cm × 75.51 cm | 44.70 cm × 75.51 cm |
| Current density | 0.0143 watts/in$^2$ | 0.0143 watts/in$^2$ |
| Temperature | 79.7° F.-89.4° F. | 79.7° F.-89.4° F. |
| Electrode material | 400 series Stainless Steel | 400 series Stainless Steel |
| Distance between electrodes | 4.60 mm | 4.60 mm |
| Time | 1 hr | 1 hr |
| Electrolyte | 1 g Na$_2$CO$_3$ | 1 g Na$_2$CO$_3$ |
| Volume of water | 750 mL | 750 mL |
| Gas (H$_2$ and O$_2$) evolved | 0.9 g | 11.2 g |

I claim:

1. A method of cleaving a bond between a first atom and a second atom in a molecule of a material, the method comprising:

calculating a first electromagnetic radiation frequency, using an equation comprising a product of a golden mean and a base frequency associated with at least one of the first atom and the second atom, wherein the base frequency is based on a maximum wavelength of absorption for the at least one of the first atom and the second atom; directing the first electromagnetic radiation frequency at the material and causing the liquid to cavitate, the first electromagnetic radiation frequency having a frequency equal to the first electromagnetic radiation frequency, wherein the first electromagnetic radiation frequency is sufficient to cleave the bond between the first atom and the second atom, wherein the material is a liquid, and the first electromagnetic radiation frequency ($v_1$) is defined by the equation:

$$v_1 = A_{fr} \cdot \Phi^n \cdot e \cdot 10^m$$

wherein $A_{fr}$ is a base frequency associated with either the first or second atom, $\Phi$ is a golden mean, e is a natural log base, n is an integer, and m is an integer.

2. The method of claim 1 wherein the first electromagnetic radiation frequency further comprises a power of the golden mean, the power being an integer.

3. The method of claim 1 further comprising:

selecting a second electromagnetic radiation frequency, the second electromagnetic radiation frequency comprising a product of a golden mean and a base frequency associated with at least one of the first atom and the second atom, wherein the base frequency is based on a maximum wavelength of absorption for the at least one of the first atom and the second atom; and directing a second electromagnetic radiation at the material and subjecting the material to cavitation, the second electromagnetic radiation having a frequency equal to the second electromagnetic radiation frequency, wherein the first electromagnetic radiation frequency and the second electromagnetic radiation frequency are sufficient to cleave the bond between the first atom and the second atom and cleaving the bond between the first atom and the second atom, wherein the first electromagnetic radiation frequency ($v_1$) is defined by the equation:

$$v_1 = A_{fr} \cdot \Phi^n \cdot e \cdot 10^m,$$

wherein $A_{fr}$ is a base frequency associated with either the first or second atom, $\Phi$ is a golden mean, e is a natural log base, n is an integer, and m is an integer; and wherein the second electromagnetic radiation frequency ($v_2$) is defined by the equation:

$$v_2 = B_{fr} \cdot \Phi^j \cdot e \cdot 10^k,$$

wherein $B_{fr}$ is a base frequency associated with either the first or second atom, $\Phi$ is a golden mean e is a natural log base, j is an integer, and k is an integer.

4. The method of claim 3 wherein $A_{fr}$ is associated with the first atom and $B_{fr}$ is associated with the second atom.

5. The method of claim 4 wherein $A_{fr}$ and $B_{fr}$ are different.

6. The method of claim 3 wherein $A_{fr}$ and $B_{fr}$ are the same; m and k are the same; and n and j are different.

7. The method of claim 3 wherein $A_{fr}$ and $B_{fr}$ are the same; n and j are the same; and m and k are different.

8. The method of claim 3 wherein at least one of m and k are zero.

9. The method of claim 3 wherein n and j are nonnegative integers.

10. The method of claim 1 wherein one of the first or second atoms is a hydrogen atom and the other of the first or second atoms is an oxygen atom.

11. The method of claim 10 wherein the hydrogen atom and the oxygen atom are part of a water molecule and the material is water.

12. The method of claim 11 further comprising subjecting the water to a magnetic field.

13. The method of claim 12 wherein the electromagnetic field is pulsed.

14. The method of claim 13 wherein the electromagnetic field is pulsed at a frequency ($v_p$) according to the formula:

$$v_p = A_{fr} \cdot \Phi^n \cdot e \cdot 10^m,$$

wherein $A_{fr}$ is a base frequency associated with an atom in a water molecule, $\Phi$ is a golden mean, e is a natural log base, n is an integer, and m is an integer.

15. The method of claim 11 further comprising causing electrical current to flow through the water.

16. The method of claim 1 wherein the bond to be cleaved is not a silicon-hydrogen covalent bond and $v_1$ is not $6.2 \times 10^2$ THz.

17. The method of claim 1 further comprising:
calculating a second electromagnetic radiation frequency ($v''$), the second electromagnetic radiation frequency being defined by the equation:

$$v'' = A_{fr} \cdot \Phi^x \cdot e^{-Lt} \cdot 10^y; \text{ and}$$

directing the second electromagnetic radiation frequency at the material, the second electromagnetic radiation frequency having a frequency equal to the second electromagnetic radiation frequency, wherein $A_{fr}$ is a base frequency associated with either the first or second atom, $\Phi$ is a golden mean, e is a natural log base, L is the natural log of two, t is equal to n, x is an integer, and y is an integer.

18. The method of claim 1 further comprising:
calculating a second electromagnetic radiation frequency ($v'''$), the second electromagnetic radiation frequency being defined by the equation:

$$v''' = (A_{fr} \cdot \Phi^a \cdot L^{-1}) \cdot 10^b e^{-L}; \text{ and}$$

directing the second electromagnetic radiation frequency at the material, the second electromagnetic radiation frequency having a frequency equal to the second electromagnetic radiation frequency,
wherein $A_{fr}$ is a base frequency associated with either the first or second atom, $\Phi$ is a golden mean, e is a natural log base, L is the natural log of two, a is an integer, and b is an integer.

19. The method of either claim 17 or 18 wherein the first electromagnetic radiation and the second electromagnetic radiation are directed at the material concurrently.

20. The method according to claim 1, further comprising the processes of Formula VI, Formula VII and Formula VIII for attenuating EMFs and cancelling possible aberrant feedback or cavitation waves during processing of the method.

21. A method of electrolyzing water, the method comprising:
frequency ($v_1$) is defined by the equation:

$$v_1 = A_{fr} \cdot \Phi^n \cdot e \cdot 10^m$$

wherein $A_{fr}$ is a base frequency associated with either the first or second atom, $\Phi$ is a golden mean, e is a natural log base, n is a nonnegative integer, and m is a nonnegative integer;

selecting a second frequency ($v_2$) defined by the equation:

$$v_2 = B_{fr} \cdot \Phi^j \cdot e \cdot 10^k,$$

wherein $B_{fr}$ is a base frequency associated with either the first or second atom, $\Phi$ is a golden mean, e is a natural log base, j is a nonnegative integer, and k is a nonnegative integer;

causing the water to cavitate;

directing a first electromagnetic radiation having the first frequency at the water; directing a second electromagnetic radiation having the second frequency at the water, wherein the step of directing the first electromagnetic radiation occurs substantially simultaneously with the step of directing the second electromagnetic radiation; and causing electrical current to flow through the water.

* * * * *